United States Patent
Umezu et al.

(10) Patent No.: US 7,610,147 B2
(45) Date of Patent: Oct. 27, 2009

(54) MAP DATA PROCESSING UNIT

(75) Inventors: Masaharu Umezu, Tokyo (JP); Tomoya Ikeuchi, Tokyo (JP); Makoto Mikuriya, Tokyo (JP); Mitsuo Shimotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 676 days.

(21) Appl. No.: 11/023,355

(22) Filed: Dec. 29, 2004

(65) Prior Publication Data
US 2005/0114018 A1 May 26, 2005

Related U.S. Application Data

(62) Division of application No. 10/668,997, filed on Sep. 24, 2003, now Pat. No. 6,980,907.

(30) Foreign Application Priority Data

Mar. 25, 2003 (JP) ............................. 2003-083103

(51) Int. Cl.
G01C 21/30 (2006.01)
G01C 21/32 (2006.01)

(52) U.S. Cl. ........................... 701/208; 701/23; 701/24; 701/25; 701/26; 701/200; 701/201; 701/202; 701/203; 701/207; 701/209; 701/210; 701/212; 340/988; 340/990; 340/991; 340/992; 340/993; 340/994; 340/995.1; 340/996; 342/357.13; 707/200; 707/203; 707/205

(58) Field of Classification Search ............. 701/23–26, 701/200–203, 207–210, 212; 340/988, 990–996; 342/357.13; 707/200, 203, 205
See application file for complete search history.

(56) References Cited

U.S. PATENT DOCUMENTS 4,849,878 A * 7/1989 Roy .......................... 707/200

(Continued)

FOREIGN PATENT DOCUMENTS

EP 1274059 1/2003

(Continued)

*Primary Examiner*—Khoi Tran
*Assistant Examiner*—Jorge O Peche
(74) *Attorney, Agent, or Firm*—Birch, Stewart, Kolasch and Birch, LLP

(57) ABSTRACT

A map data processing unit includes a batch update section and dynamic update section. A type of update data fed from an update data input section is decided using header information. If the update data is route search data, the batch update section collectively updates all the map data to latest version map data according to the update data from the update data input section. If the update data is not the route search data, the dynamic update section updates the map data to the latest version map data according to the update data every time the map data becomes necessary. Thus performing the collective or dynamic update according to the type of the update data enables the update to the latest map data without affecting the operation speed of a navigation function, with minimizing the time precluding the use of the navigation function.

8 Claims, 27 Drawing Sheets

U.S. PATENT DOCUMENTS

| | | | |
|---|---|---|---|
| 5,214,757 A * | 5/1993 | Mauney et al. | 715/751 |
| 5,438,674 A * | 8/1995 | Keele et al. | 711/4 |
| 5,666,645 A * | 9/1997 | Thomas et al. | 725/47 |
| 5,680,640 A * | 10/1997 | Ofek et al. | 710/19 |
| 5,760,742 A * | 6/1998 | Branch et al. | 342/457 |
| 5,982,392 A * | 11/1999 | Anfossi et al. | 345/502 |
| 6,141,022 A * | 10/2000 | Anfossi et al. | 345/545 |
| 6,230,098 B1 * | 5/2001 | Ando et al. | 701/208 |
| 6,546,334 B1 * | 4/2003 | Fukuchi et al. | 701/208 |
| 6,549,847 B2 * | 4/2003 | Ikeuchi et al. | 701/208 |
| 6,598,134 B2 * | 7/2003 | Ofek et al. | 711/162 |
| 6,640,187 B1 * | 10/2003 | Chenault et al. | 701/209 |
| 6,728,633 B2 * | 4/2004 | Mikuriya et al. | 701/208 |
| 6,766,248 B2 | 7/2004 | Miyahara | |
| 6,985,912 B2 * | 1/2006 | Mullins et al. | 707/103 R |
| 6,999,956 B2 * | 2/2006 | Mullins | 707/2 |
| 7,149,730 B2 * | 12/2006 | Mullins et al. | 707/2 |
| 2001/0001870 A1 * | 5/2001 | Ofek et al. | 711/112 |
| 2001/0004724 A1 * | 6/2001 | Nagaki | 701/208 |
| 2001/0025223 A1 | 9/2001 | Geiger et al. | |
| 2002/0004890 A1 * | 1/2002 | Ofek et al. | 711/161 |
| 2002/0082773 A1 * | 6/2002 | Ikeuchi et al. | 701/211 |
| 2002/0091485 A1 * | 7/2002 | Mikuriya et al. | 701/208 |
| 2003/0208505 A1 * | 11/2003 | Mullins et al. | 707/102 |
| 2003/0220735 A1 * | 11/2003 | Nimura | 701/208 |
| 2004/0123048 A1 * | 6/2004 | Mullins et al. | 711/141 |
| 2007/0055647 A1 * | 3/2007 | Mullins et al. | 707/2 |
| 2008/0040029 A1 * | 2/2008 | Breed | 701/208 |
| 2008/0040770 A1 * | 2/2008 | Angquist et al. | 725/135 |

FOREIGN PATENT DOCUMENTS

| | | |
|---|---|---|
| JP | 07-021498 | 1/1995 |
| JP | 11-306155 | 11/1999 |
| JP | 2002-041401 | 2/2002 |
| JP | 2002-049624 A | 2/2002 |
| JP | 2002-318532 | 10/2002 |

* cited by examiner

MAP DATA

LOCAL DATA FOR MAP DISPLAY

| DATA SIZE |
| DATA RANGE |
| ROAD LINE COORDINATE STRING |
| BACKGROUND LINE COORDINATE STRING |
| DISPLAY CHARACTER STRING |
| DISPLAY SYMBOLS |

LOCAL DATA FOR ROUTE SEARCH

| DATA SIZE |
| DATA RANGE |
| NODE DATA |
| LINK DATA |
| TRAFFIC REGULATION DATA |

DIFFERENTIAL UPDATE DATA

UPDATE DATA

MAP DATA PROCESSING UNIT

This application is a Divisional of application Ser. No. 10/668,997, filed on Sep. 24, 2003 now U.S. Pat. No. 6,980,907, and for which priority is claimed under 35 U.S.C. § 120; and this application claims priority of Application No. 2003-83103 filed in Japan on Mar. 25, 2003 under 35 U.S.C. § 119; the entire contents of all are hereby incorporated by reference.

BACKGROUND OF THE INVENTION

1. Field of the Invention

The present invention relates to a map data processing unit capable of updating map data without affecting the operation speed of its navigation function with minimizing the time of precluding the use of the navigation function.

2. Description of Related Art

A conventional vehicle-mounted navigation system or the like usually operates on map data stored in a recording medium such as a CD-ROM or DVD-ROM, and updates the map data by changing the CD-ROM or DVD-ROM. The method, however, cannot update the data frequently, only once or twice a year at most, and hence it cannot always provide the latest map data.

In contrast with this, a method is proposed of updating the map data in a shorter period of time by storing the map data in a rewritable medium (refer to Relevant Reference 1, for example).

Relevant Reference 1: Japanese patent application laid-open No. 2002-49624 (page 4, FIG. 7).

With such an arrangement, the conventional map data processing unit updates the map data when it becomes necessary. Thus, when using a plurality of map data in processing such as route search, it imposes a heavy load on the navigation system, thereby presenting a problem of retarding the operation.

In addition, carrying out the update processing of all the map data at once offers a problem of precluding the use of the vehicle-mounted navigation because the update processing takes a lot of time. For example, to rewrite all the map data by reading data from a DVD-ROM, about nine gigabit data must be read. Since a current DVD-ROM drive usually reads about 1-2 MB per second, it takes about 1-2 hours to read the map data, with precluding the use of the navigation during that time.

SUMMARY OF THE INVENTION

The present invention is implemented to solve the foregoing problem. It is therefore an object of the present invention to provide a map data processing unit capable of updating the map data without affecting the operation speed of its navigation function with minimizing the time of disabling the navigation function.

According to a first aspect of the present invention, there is provided a map data processing unit that has a function of updating map data, and includes a display section for performing various types of display including display of a processing result of the map data, a manipulation section for carrying out input manipulation for processing the map data, and a control section for performing entire control, the map data processing unit including: an update data input section for inputting update data for updating the map data to latest version map data; a batch update section for collectively updating all the map data to the latest version map data in accordance with the update data fed from the update data input section; a dynamic update section for updating the map data to the latest version map data in accordance with the update data fed from the update data input section every time the map data becomes necessary; an update method selecting section for selecting one of the batch update section and dynamic update section in response to the update data; and a map data storing section for storing the map data.

Thus, the map data processing unit can switch the update method between the batch update and the dynamic update in response to the update data. As a result, it offers an advantage of being able to perform the update to the latest version map data without affecting the operation speed of the navigation, with minimizing the time of precluding the use of the navigation.

According to a second aspect of the present invention, there is provided a map data processing unit that has a function of updating map data, and includes a display section for performing various types of display including display of a processing result of the map data, a manipulation section for carrying out input manipulation for processing the map data, and a control section for performing entire control, the map data processing unit including: a post-update data cache section for temporarily storing, in a cache, latest version map data to be read in response to a request for map data; an update data input section for inputting update data for updating the map data to the latest version map data, when the post-update data cache section does not store the map data; and a dynamic update section for updating, when the update data input section inputs the update data, old version map data to latest version map data to be stored in the cache, in accordance with the update data fed from the update data input section every time a request for the map data occurs.

Thus, the map data processing unit can utilize the latest version map data by only reading it from the cache using the post-update data cache section, if the map data associated with the request from an application is stored in the cache by the post-update data cache section. As a result, it offers an advantage of being able to reduce the time of the dynamic update processing.

According to a third aspect of the present invention, there is provided a map data processing unit including: an update data input section for inputting update data for updating old version map data to latest version map data; an update data recording section for recording the update data input by the update data input section; an update section for updating, when a map data request from an application occurs, the old version map data to the latest version map data in accordance with the old version map data and the update data stored in the update data recording section, which old version map data and update data correspond to the map data associated with the map data request from the application; a map data storing section for storing the map data; a display section for displaying a processing result of the map data; a manipulation section for performing input manipulation for processing the map data; and a control section for carrying out overall control.

Thus, the map data processing unit offers an advantage of being able to use the update data input section for other purposes during the navigation operation by inputting from the update data input section the update data for updating the map data associated with the request for the map data from the application at a timing different from the timing during the navigation operation, and by recording the update data into the update data recording section.

BRIEF DESCRIPTION OF THE DRAWINGS

FIG. 7 is a diagram illustrating a format of local data of the embodiment 1 of the map data processing unit in accordance with the present invention;

DETAILED DESCRIPTION OF THE PREFERRED EMBODIMENTS

The invention will now be described with reference to the accompanying drawings.

Embodiment 1

Figure 1:
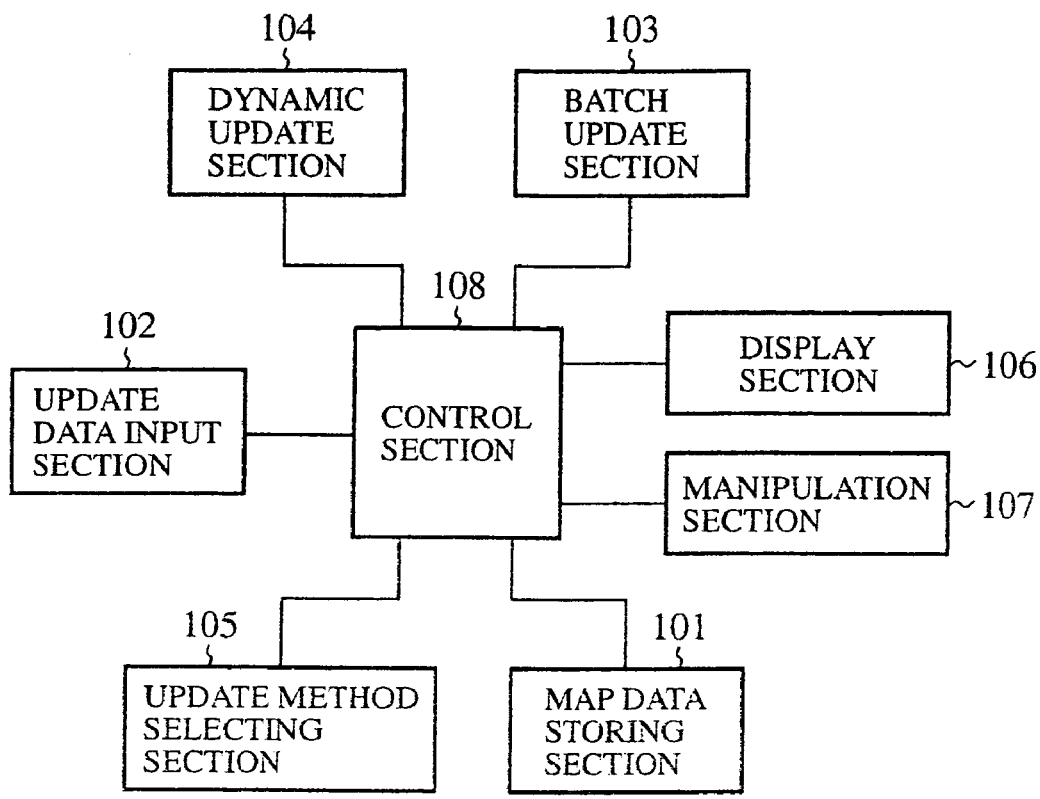
FIG. 1 is a block diagram showing a configuration of an embodiment 1 of a map data processing unit in accordance with the present invention.

FIG. 1 is a block diagram showing a configuration of an embodiment 1 of the map data processing unit. It comprises a map data storing section 101 for storing map data; an update data input section 102 for inputting update data; a batch update section 103 for collectively updating the map data stored in the map data storing section 101 using one or more update data input via the update data input section 102; a dynamic update section 104 for updating the map data stored in the map data storing section 101 using one or more update data input via the update data input section 102 when necessary; an update method selecting section 105 for selecting one of the batch update section 103 and dynamic update section 104 in response to differential data; a display section 106 for carrying out display based on the map data; a manipulation section 107 for carrying out various manipulations; and a control section 108 for controlling the entire system.

The map data storing section 101 for storing the map data consists of a rewritable medium such as a hard disk for storing the map data after update. The update data input section 102 for inputting the update data consists of a data storing medium such as a CD-ROM, DVD-ROM or memory card. The batch update section 103 collectively updates the map data stored in the map data storing section 101 using one or more update data supplied from the update data input section 102. The dynamic update section 104 updates the map data stored in the map data storing section 101 using one or more update data supplied from the update data input section 102 as needed. The update method selecting section 105 selects one of the batch update section 103 and dynamic update section 104 in response to the update data. The display section 106 carries out the display in accordance with the map data.

Figure 5:
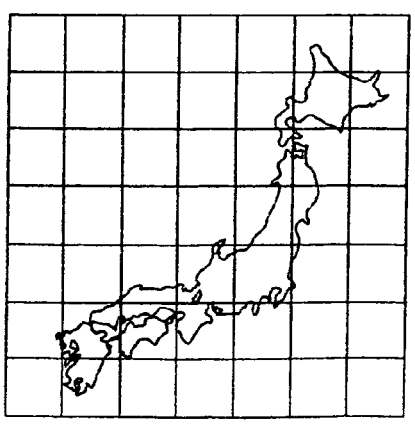
FIG. 5 is a diagram illustrating a format of the map data stored in a map data storing section of the embodiment 1 of the map data processing unit in accordance with the present.
Figures 6, 7A, 7B:
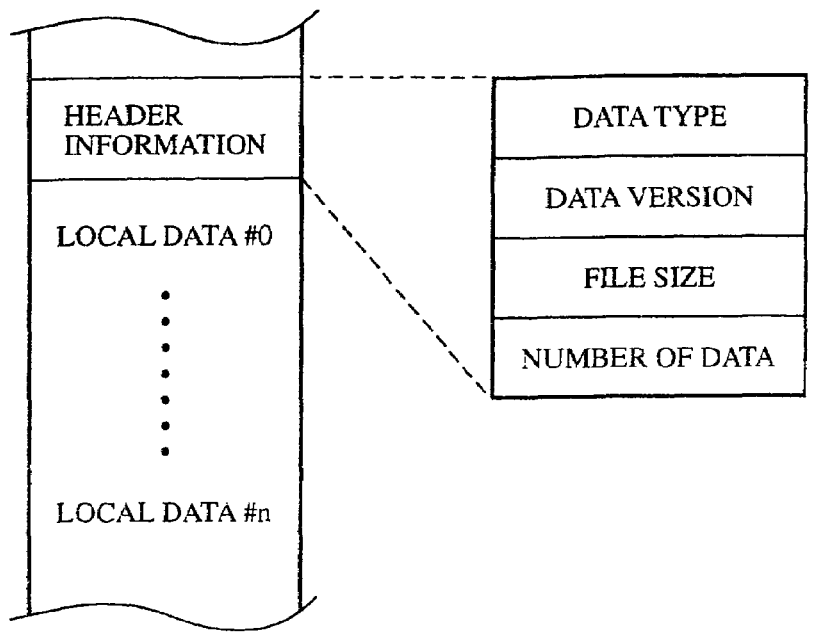
FIG. 6 is a diagram illustrating a format of the map data format stored in the map data storing section of the embodiment 1 of the map data processing unit in accordance with the present invention.

FIG. 5 is a diagram illustrating a format of the map data stored in the map data storing section 101; and FIG. 6 is a diagram illustrating a format of a map data file stored in the map data storing section 101.

The map data consists of files, each of which includes one type of data. Each file contains header information and a plurality of local data (data #0-data #n). The header information consists of a data type, data version, file size and the number of the data as illustrated in FIG. 6. The data type indicates whether the data is used for map display, for location, for route search or for route guidance corresponding to the individual functions of the navigation system.

The local data refers to data on individual regions obtained by dividing the entire area. For example, data on whole Japan as illustrated in FIG. 5 correspond to the entire map data file as illustrated in FIG. 6, and the individual areas indicated by a mesh in FIG. 5 correspond to local data (local data #0-#n).

FIG. 7 is a diagram illustrating formats of the local data. FIG. 7(*a*) illustrates a format of the local data used for map display. It includes the data size of the local data; the data range of the local data; and data actually used for the map display such as road line coordinate strings representing geometry of roads, background line coordinate strings representing geometry of rivers, railroads and the like, display character strings for displaying place names and the like, and display symbols for representing entities such as a school and hospital. FIG. 7(*b*) illustrates a format of the local data for route search. It includes the data size of the local data; the data range of the local data; node data mainly representing intersections; link data representing the road data, and traffic regulation data.

As for the update data input via the update data input section 102 as shown in FIG. 1, there are two types of data: a complete set of update data for replacing the old map data; and differential update data for carrying out the update in accordance with the difference between the old version and latest version of the map data. The format of the complete set of update data is the same as that of the map data illustrated in FIGS. 5 and 6.

Figure 8:
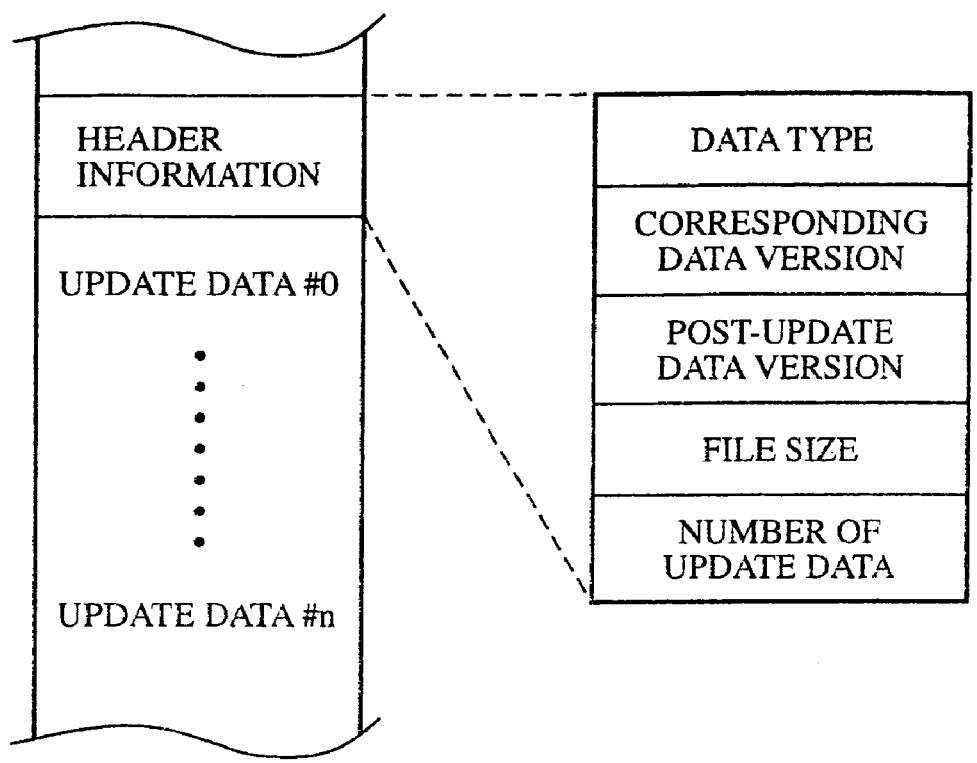
FIG. 8 is a diagram illustrating a format of differential update data of the embodiment 1 of the map data processing unit in accordance with the present invention.

FIG. 8 is a diagram illustrating a format of the differential update data. Just as the map data, the differential update data consists of files, each of which includes one type of data. Each file contains header information and a plurality of update data #0-#n. The update data #0-#n correspond to the local data #0-#n as illustrated in FIG. 6.

The header information consists of information items indicating a data type, a corresponding data version, a post-update data version, a file size and the number of the update data. The data type corresponds to the data type of the map data of FIG. 6. The corresponding data version indicates the version of the map data to be updated. For example, when the corresponding data version is version 1.0, and the post-update data version is version 1.1, the differential update data is the data for updating the map data of version 1.0 to the map data of version 1.1.

Figure 9:
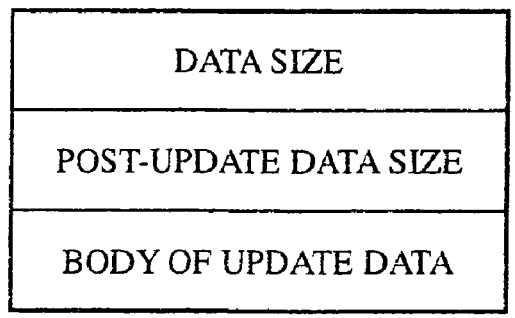
FIG. 9 is a diagram illustrating a format of update data of the embodiment 1 of the map data processing unit in accordance with the present invention.

FIG. 9 is a diagram illustrating a format of the update data consisting of a data size indicating the size of the update data itself, a post-update data size indicating the size of the map data after the update, and the body of the update data for carrying out the map update.

Next, the operation of the present embodiment 1 will be described.

Figure 3:
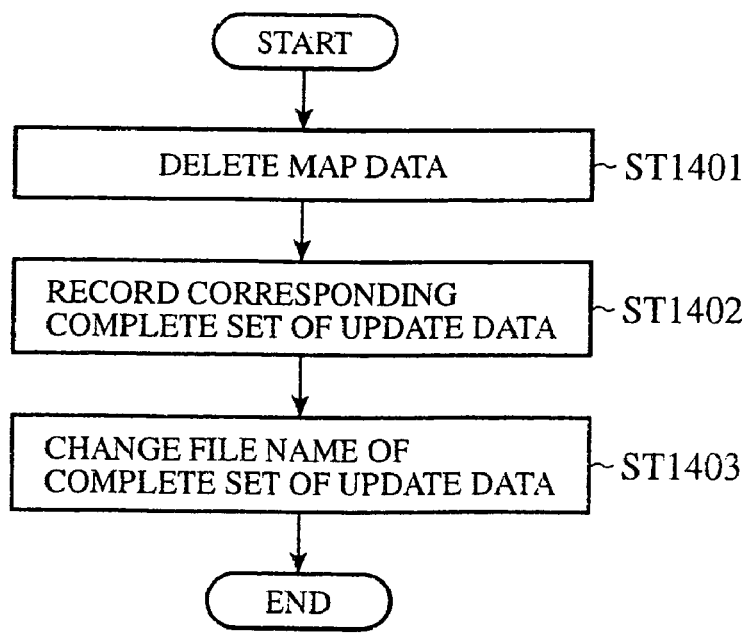
FIG. 3 is a flowchart illustrating the operation of a batch update section of the embodiment 1 of the map data processing unit in accordance with the present invention.
Figure 2:
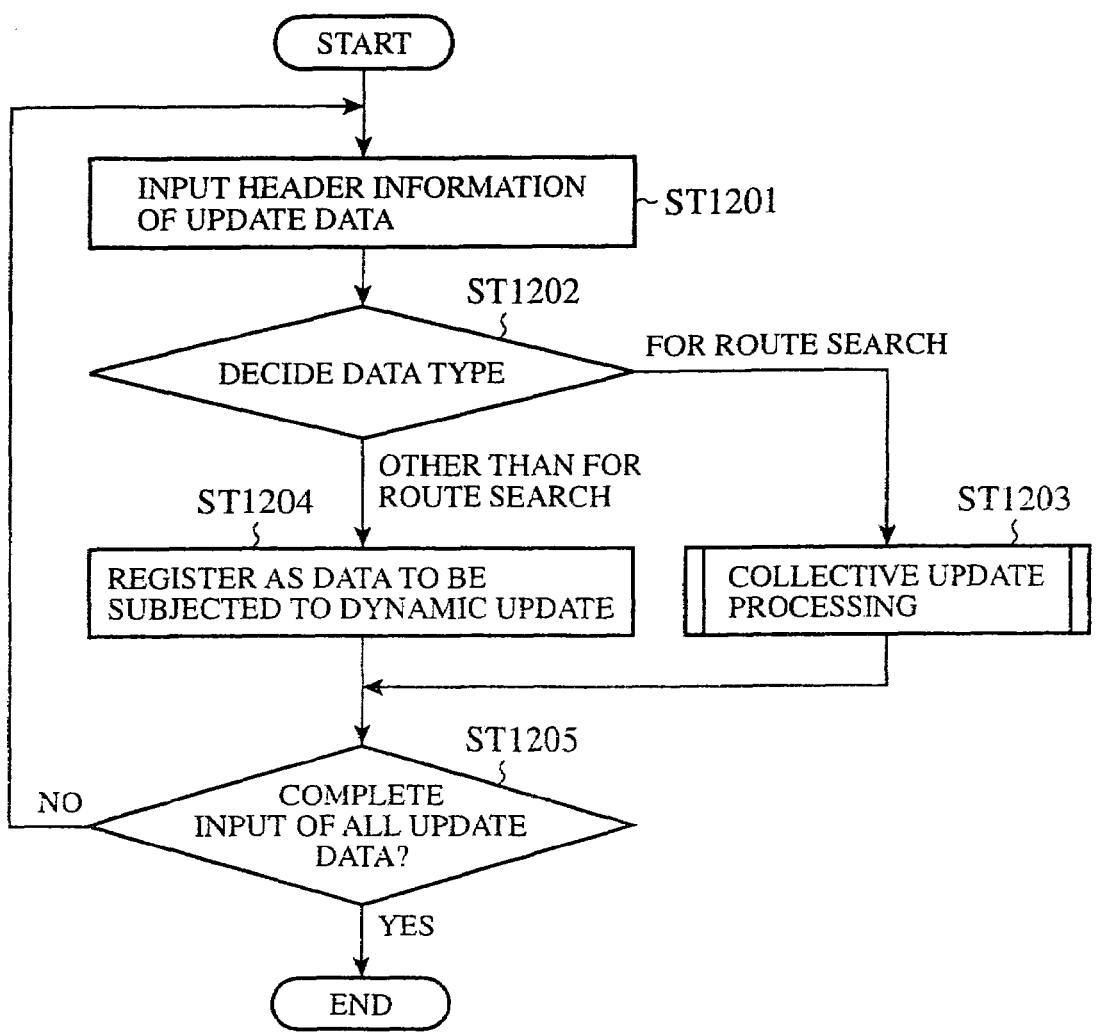
FIG. 2 is a flowchart illustrating the operation of an update method selecting section of the embodiment 1 of the map data processing unit in accordance with the present invention.
Figure 4:
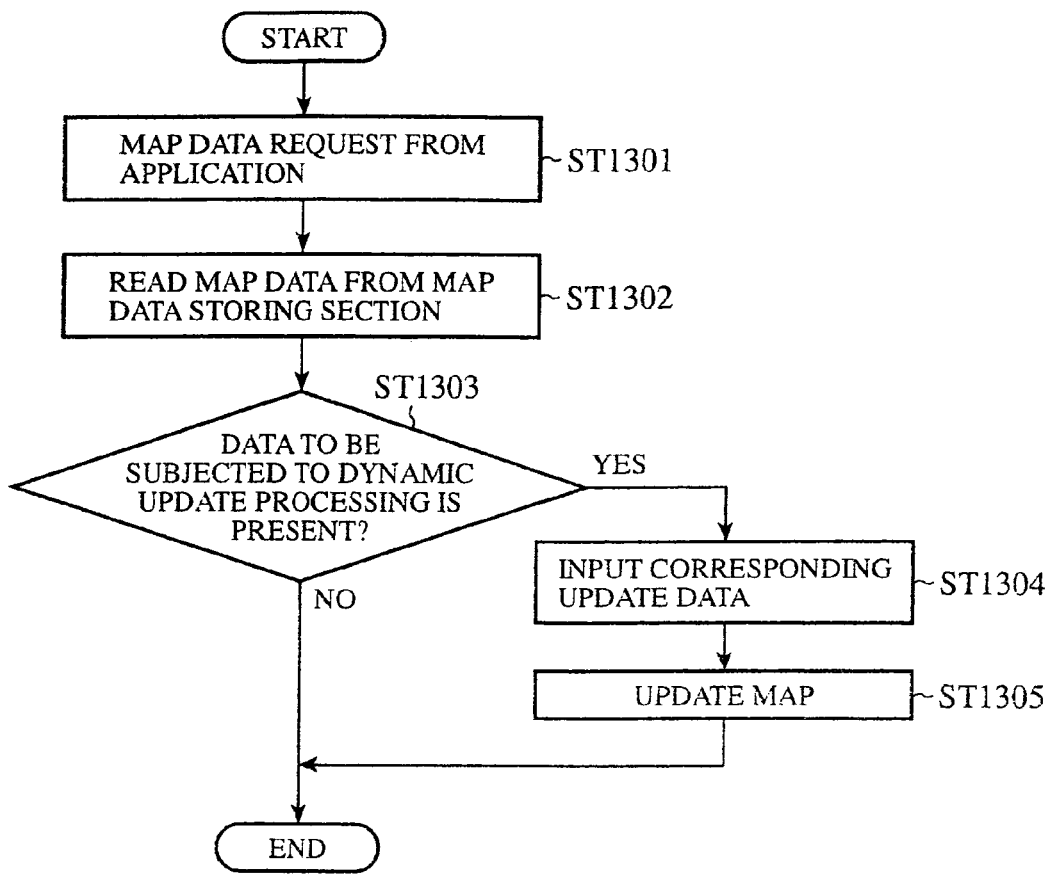
FIG. 4 is a flowchart illustrating the operation of a dynamic update section of the embodiment 1 of the map data processing unit in accordance with the present invention.

FIG. 2 is a flowchart illustrating the operation of the update method selecting section 105 in the embodiment 1 of the map data processing unit. FIG. 3 is a flowchart illustrating the operation of the batch update section 103, and FIG. 4 is a flowchart illustrating the operation of the dynamic update section 104.

First, the operation of the update method selecting section 105 will be described with reference to the flowchart of FIG. 2. The update method selecting section 105 acquires header information of the update data from the update data input section 102 at step ST1201. Subsequently, the update method selecting section 105 decides the data type of the header information at step ST1202. If it is the data for route search, the update method selecting section 105 has the batch update section 103 carry out the batch update at step ST1203. If the data is not the data for route search, the update method selecting section 105 registers the data as the data to be subjected to the dynamic update at step ST1204. Finally, the update method selecting section 105 makes a decision as to whether the header information of all the data has been input at step ST1205, and terminates the processing if the input has been completed. Otherwise, the update method selecting section 105 repeats the processing from step ST1201.

Next, the operation of the batch update section 103 will be described with reference to FIG. 3.

The batch update section 103 deletes the map data to be updated at step ST1401, and records the corresponding complete set of update data in the map data storing section 101 at step ST1402. Then, the batch update section 103 changes the file name of the complete set of update data to that of the deleted map data at step ST1403.

Next, the operation of the dynamic update section 104 will be described with reference to FIG. 4.

In response to a request for map data from the application at step ST1301, the dynamic update section 104 reads the map data from the map data storing section 101 at step ST1302. Then, the dynamic update section 104 makes a decision as to whether the data to be subjected to the dynamic update corresponding to the read map data is present or not at step ST1303. If the data is not present, the dynamic update section 104 terminates the processing. Otherwise, the dynamic update section 104 acquires the corresponding update data at step ST1304, and updates the map at step ST1305.

Thus, the batch update section 103 updates the set of data for route search to the latest version map data, and records the latest version map data in the map data storing section 101. On the other hand, the dynamic update section 104 updates each of the remaining data every time the application requires it.

The processing time of FIG. 3 is nearly the read time of the complete set of update data, which corresponds to the size of the map data for route search of about several tens of megabytes. Thus, the processing can be completed in several tens of seconds in the case of reading the data from the DVD-ROM.

Although the foregoing description is made by way of example in which the data for route search is subjected to the batch update processing, data other than the route search data, which are considered to be rather small in size, can be used as the data to be subjected to the batch update processing.

In addition, although the target data to be subjected to the batch update processing is decided according to the data type, this is not essential. For example, the target data to be subjected to the batch update processing can be decided according to the data size rather than the data type.

Furthermore, although the update data input section 102 is assumed to be a data storing medium, this is not essential. For example, the update data can be input via various types of communication means such as a mobile phone, DSRC (Dedicated Short Range Communication), Bluetooth, and wireless LAN.

As described above, the present embodiment 1 makes a decision as to the processing time and storage capacity required for carrying out the batch update processing from the map data type, map data size and the like; selects the data to be subjected the batch update; carries out the batch update processing; and carries out the dynamic update processing of the remaining data as needed. Thus, the present embodiment 1 offers an advantage of being able to provide a map data processing unit capable of updating to the latest map data without affecting the operation speed of the navigation function, with minimizing the time of disabling the navigation function.

Embodiment 2

Figure 10:
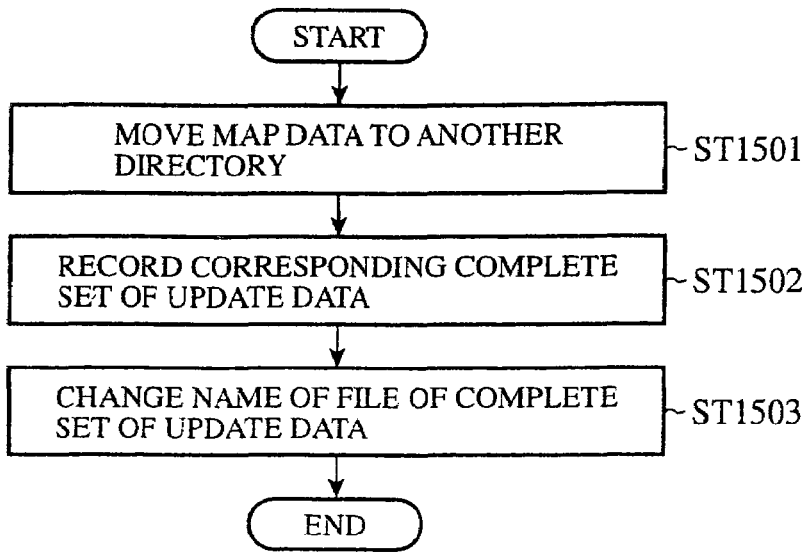
FIG. 10 is a flowchart illustrating the operation of the batch update section of an embodiment 2 of the map data processing unit in accordance with the present invention.

FIG. 10 is a flowchart illustrating the operation of the batch update section of the present embodiment 2 of the map data processing unit. The configuration of the map data processing unit to which the batch update section of the present embodiment 2 is applied is the same as that of FIG. 1.

Referring to FIG. 10, the operation of the batch update section of the map data processing unit will be described.

The batch update section moves the map data to be updated to another directory to keep the map data before the update at step ST1501. It records the corresponding complete set of update data into the map data storing section 101 at step ST1502, and changes the file name of the complete set of update data at step ST1503.

Thus, the present embodiment 2 keeps the map data before the update. Accordingly, it offers an advantage of being able to recover the state before the update with ease, and hence to provide the map data processing unit capable of carrying out the navigation using the map data of the previous version.

Embodiment 3

Figure 11:
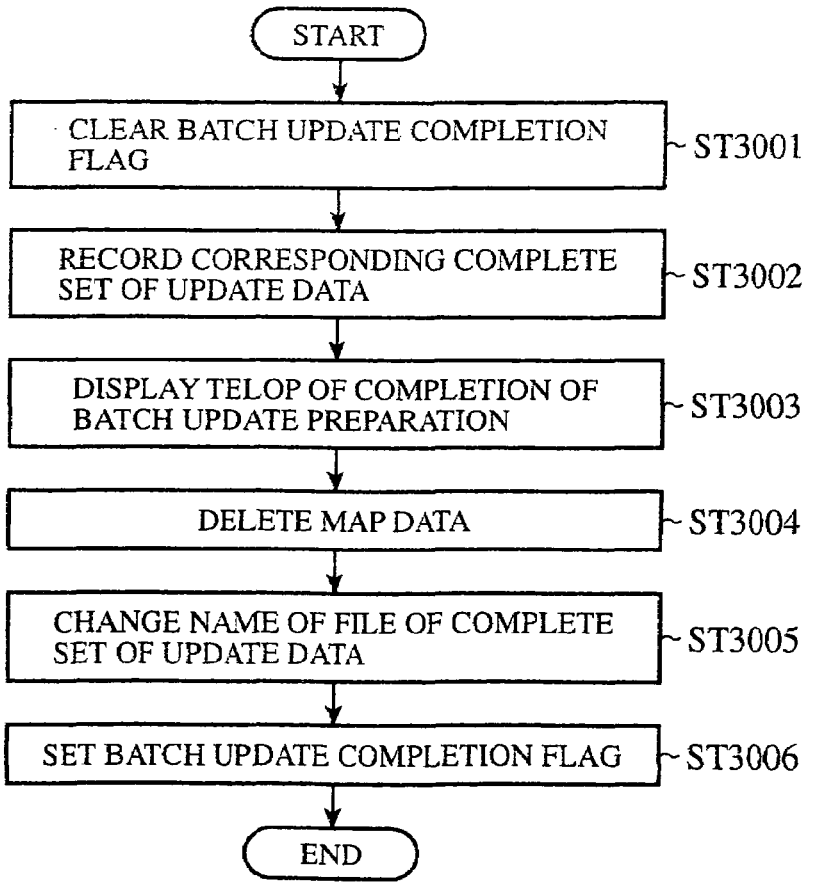
FIG. 11 is a flowchart illustrating the operation of the batch update section of an embodiment 3 of the map data processing unit in accordance with the present invention.
Figure 12:
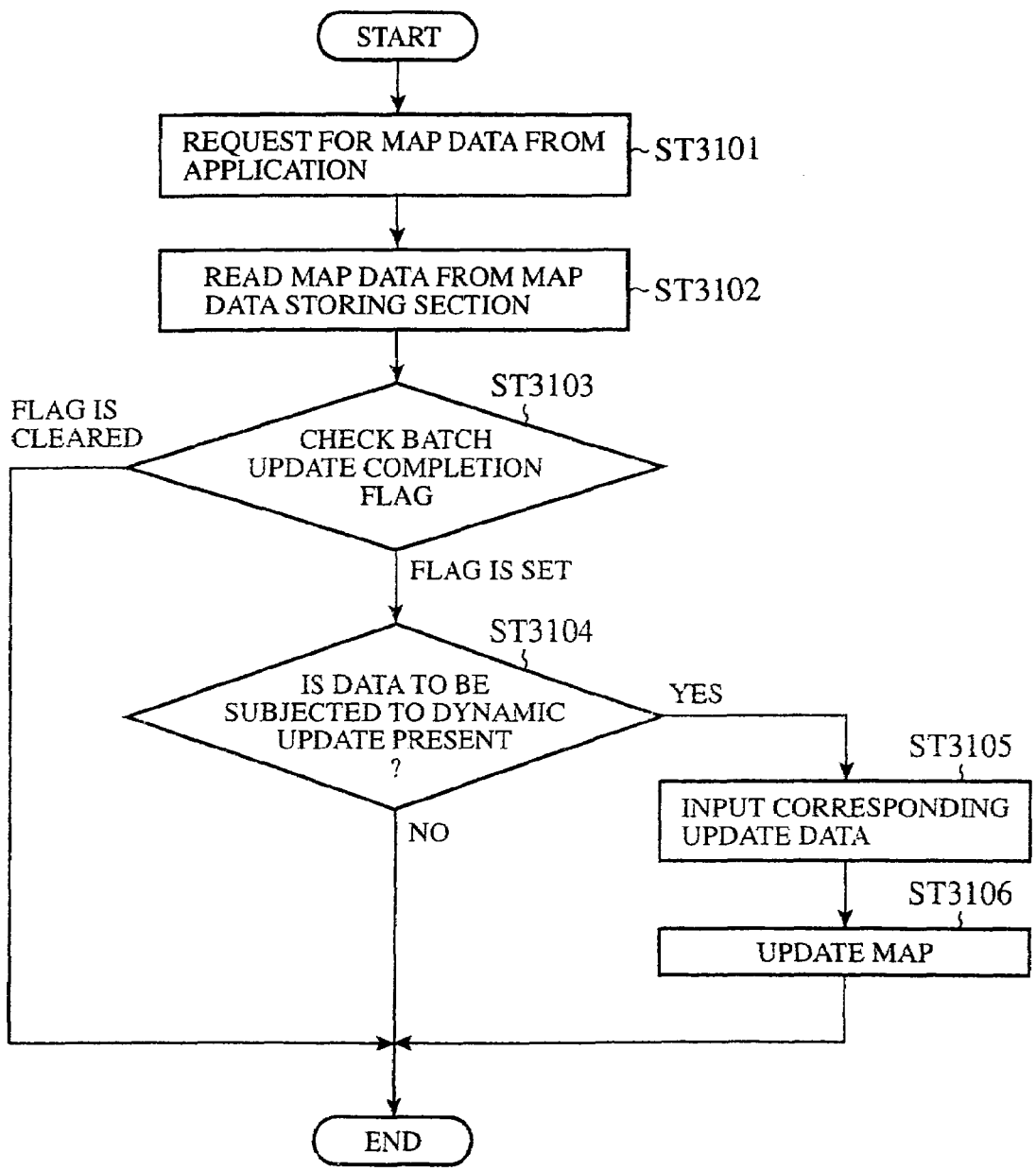
FIG. 12 is a flowchart illustrating the operation of the dynamic update section of the embodiment 3 of the map data processing unit in accordance with the present invention.

FIG. 11 is a flowchart illustrating the operation of the batch update section of the present embodiment 3 of the map data processing unit; and FIG. 12 is a flowchart illustrating the operation of its dynamic update section. The configuration of the map data processing unit to which the batch update section and dynamic update section of the present embodiment 3 are applied is the same as that of FIG. 1.

Referring to the flowchart of FIGS. 11 and 12, the operation of the present embodiment 3 will be described.

First, the operation of the batch update section 103 will be described with reference to FIG. 11. The batch update section 103 clears a batch update completion flag at step ST3001 to indicate that the batch update has not yet been completed. Then, the batch update section 103 records the corresponding complete set of update data in the map data storing section 101 at step ST3002, and displays a batch update preparation completion telop on the display section 106 shown in FIG. 1 at step ST3003. Subsequently, the batch update section 103 deletes the map data at step ST3004, and changes the file name of the complete set of update data for the batch update to the file name of the deleted map data at step ST3005. Finally, the batch update section 103 sets the batch update completion flag at step ST3006 to indicate that the batch update has been completed.

Next, the operation of the dynamic update section 104 will be described with reference to FIG. 12.

In response to a map data request from an application at step ST3101, the dynamic update section 104 reads the appropriate map data from the map data storing section 101 at step ST3102. Then, the dynamic update section 104 checks the batch update completion flag to decide as to whether the batch update completion flag has been cleared or not at step ST3103. If it has been cleared, and hence indicates that the batch update has not yet been completed, the dynamic update section 104 terminates the dynamic update processing. As a result, the navigation is available using the old version map data read from the map data storing section 101 in response to the map data request from the application even during the batch update. On the other hand, if the batch update completion flag has been set, and hence indicates that the batch update has been completed, the dynamic update section 104 makes a decision as to whether the data to be subjected to the dynamic update corresponding to the map data read from the map data storing section 101 is present or not at step ST3104. If it is not present, the dynamic update section 104 terminates the dynamic update processing. In contrast, if it is present, the dynamic update section 104 acquires the corresponding update data at step ST3105, and updates the map in accordance with the dynamic update processing at step ST3106.

As described above, the present embodiment 3 can read, in response to the map data request from the application, the old version map data from the map data storing section 101 even during the batch update processing that continues until the batch update is completed and the batch update completion flag is set, thereby making available the navigation using the old version map data. Thus, the present embodiment 3 offers an advantage of being able to provide the map data processing unit capable of increasing the convenience of users.

Embodiment 4

Figure 13:
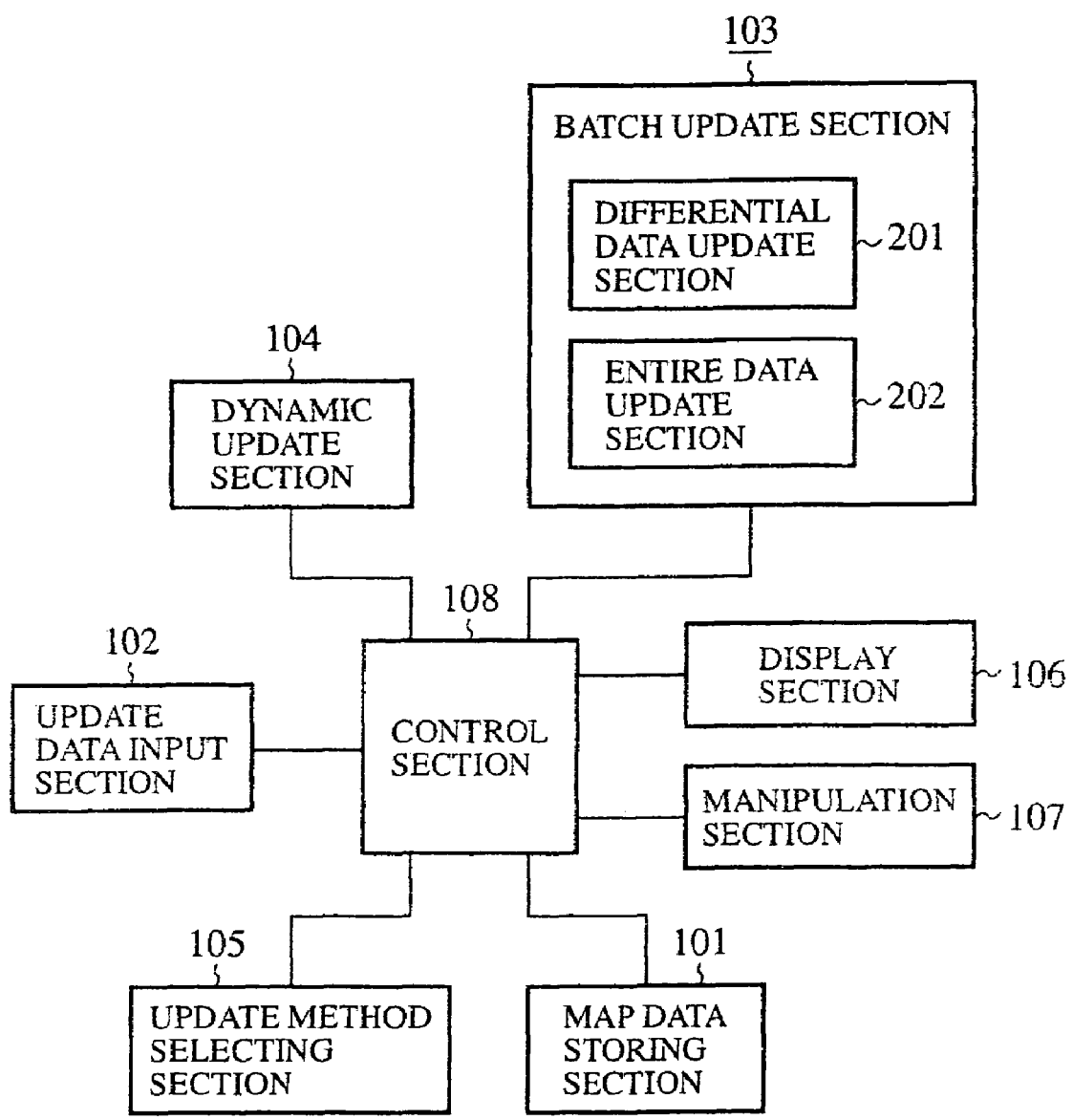
FIG. 13 is a block diagram showing a configuration of an embodiment 4 of the map data processing unit in accordance with the present invention.

FIG. 13 is a block diagram showing a configuration of the present embodiment 4 of the map data processing unit. In FIG. 13, the same or like portions to those of FIG. 1 are designated by the same reference numerals, and their description is omitted here.

In the present embodiment 4 of the map data processing unit, the batch update section 103 comprises a differential data update section 201 and an entire data update section 202.

The differential data update section 201 carries out the map update in accordance with the differential data between the old version and latest version map data. In contrast, the entire data update section 202 carries out the map update by rewriting the old complete set of map data to the latest version map data in accordance with the corresponding new complete set of update data.

Figure 14:
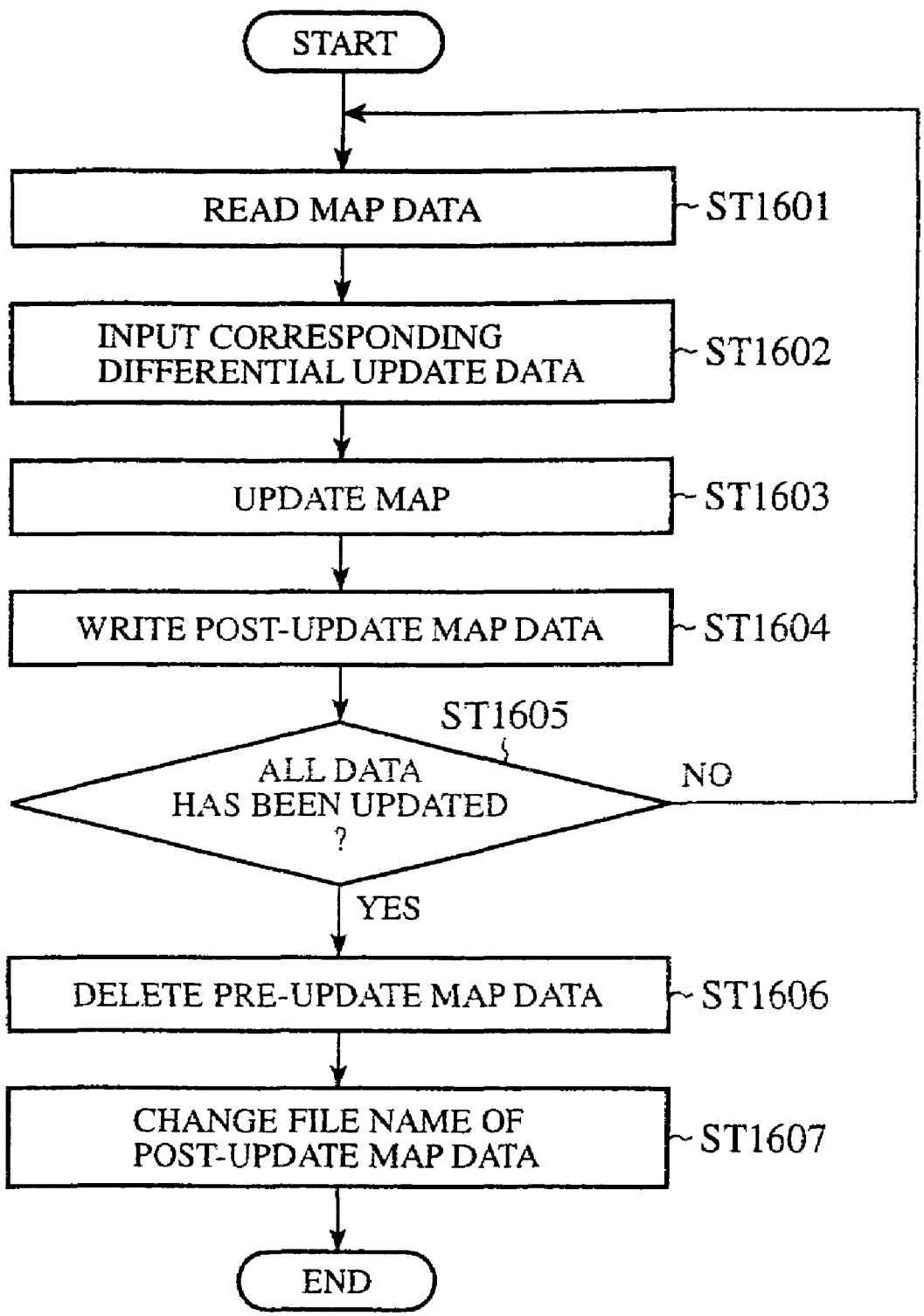
FIG. 14 is a flowchart illustrating the update operation of the map data by a differential data update section in the embodiment 4 of the map data processing unit in accordance with the present invention.

FIG. 14 is a flowchart illustrating the update operation of the map data by the differential data update section 201. On the other hand, the flow of the update operation of the map data by the entire data update section 202 is given by FIG. 3 described in connection with the foregoing embodiment 1.

Referring to FIG. 14, the map update operation by the differential data update section 201 will be described.

First, the differential data update section 201 reads the old version map data recorded in the map data storing section 101 at step ST1601. Second, the differential data update section 201 acquires the corresponding differential update data from the update data input section 102 at step ST1602, and updates the map in accordance with the old version map data and differential update data at step ST1603. Then, the differential data update section 201 records the post-update map data in the map data storing section 101 at step ST1604.

Subsequently, the differential data update section 201 makes a decision as to whether all the date have been updated or not at step ST1605. If the map data that has not yet been updated is left, the differential data update section 201 repeats the processing from step ST1601. In contrast, if it completes the update of all the map data, the differential data update section 201 deletes the map data before the update at step ST1606. Then, the differential data update section 201 changes the file name of the map data after the update to that of the map data before the update at step ST1607.

As described above, the present embodiment 4 enables the batch update using the complete set of update data or the differential update data. Thus, it offers an advantage of being able to provide the map data processing unit capable of reducing the amount of the update data.

Embodiment 5

Figure 15:
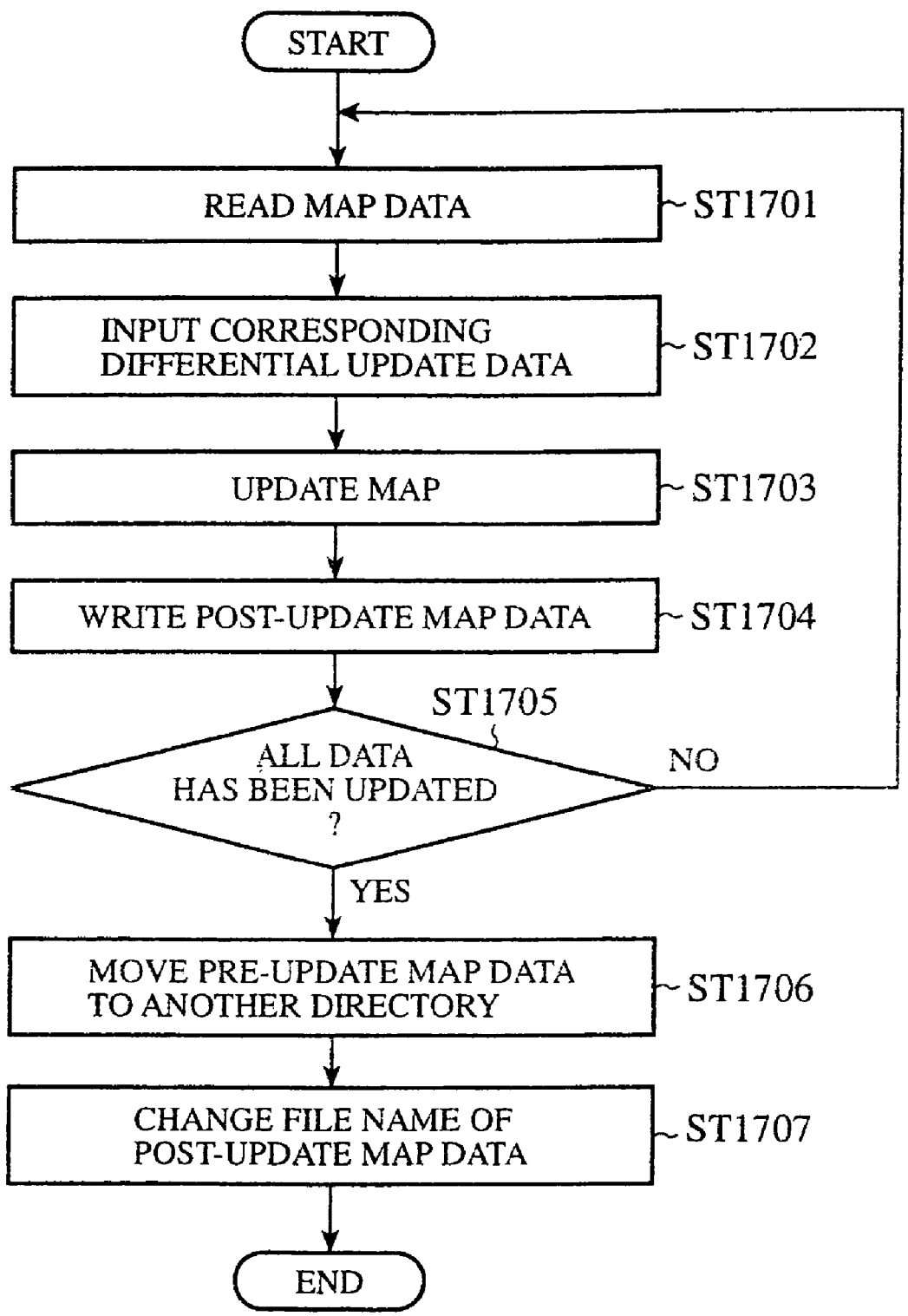
FIG. 15 is a flowchart illustrating the update operation of the map data by the differential data update section in an embodiment 5 of the map data processing unit in accordance with the present invention.

In the present embodiment 5 of the map data processing unit, the batch update section 103 has also the differential data update section and entire data update section as in the embodiment 4 of the map data processing unit. The entire data update section updates the map data just as that of the foregoing embodiment 4. However, the differential data update section updates the map data in a different manner. FIG. 15 is a flowchart illustrating the update operation of the map data by the differential data update section.

Referring to FIG. 15, the update operation of the map data by the differential data update section of the present embodiment 5 will be described.

The differential data update section reads the map data recorded in the map data storing section 101 at step ST1701, and acquires the differential update data from the update data input section 102 at step ST1702. Then, the differential data update section updates the map at step ST1703, and records the map data after the update in the map data storing section 101 at step ST1704. Subsequently, the differential data update section makes a decision as to whether it updates all the data at step ST1705. If the map data that has not yet been updated is left, the differential data update section repeats the processing from step ST1701. If the update of all the map data has been completed, the differential data update section moves the map data before the update to another directory at step ST1706, and changes the file name of the map data after the update at step ST1707.

Thus, the present embodiment 5 stores the map data before the update to the separate directory. Accordingly, it offers an advantage of being able to provide the map data processing unit capable of recovering the state before the update with ease.

In addition, the present embodiment 5 can carry out the batch update by using either the complete set of update data or the differential update data. Thus, it offers an advantage of being able to provide the map data processing unit capable of reducing the amount of the update data by using the differential update data.

Embodiment 6

Figure 16:
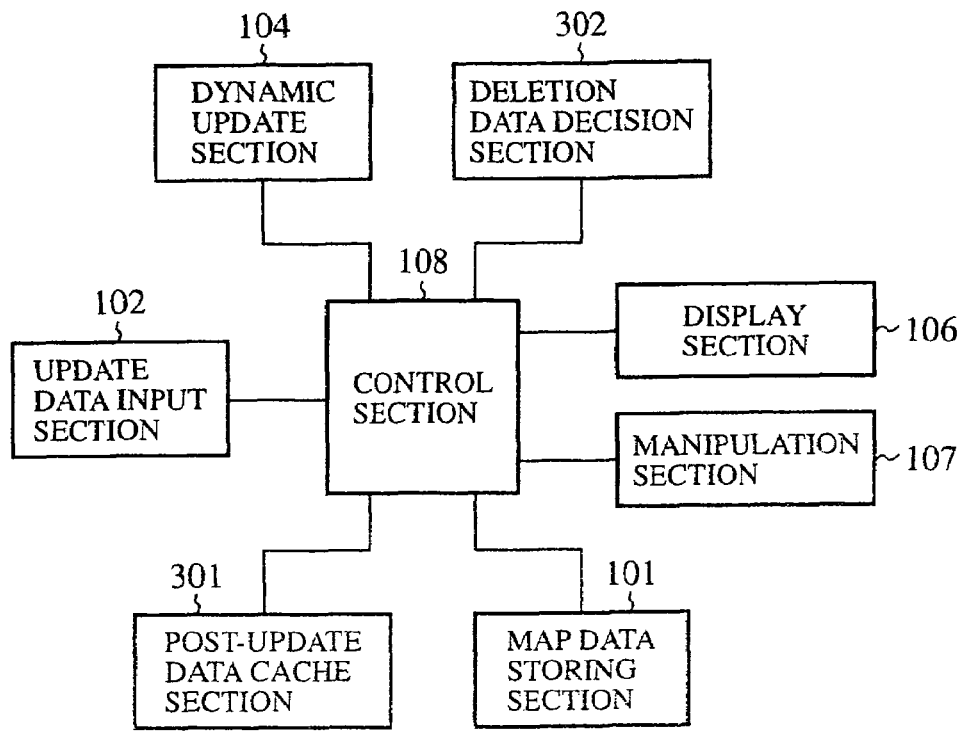
FIG. 16 is a block diagram showing a configuration of an embodiment 6 of the map data processing unit in accordance with the present invention.

FIG. 16 is a block diagram showing a configuration of the present embodiment 6 of the map data processing unit. In FIG. 16, the same or like portions to those of FIG. 1 are designated by the same reference numerals, and their description is omitted here. The present embodiment 6 of the map data processing unit comprises a post-update data cache section 301 for caching the map data updated by the dynamic update section 104, and a deletion data decision section 302 for deciding map data to be deleted among the map data cached.

Figure 17:
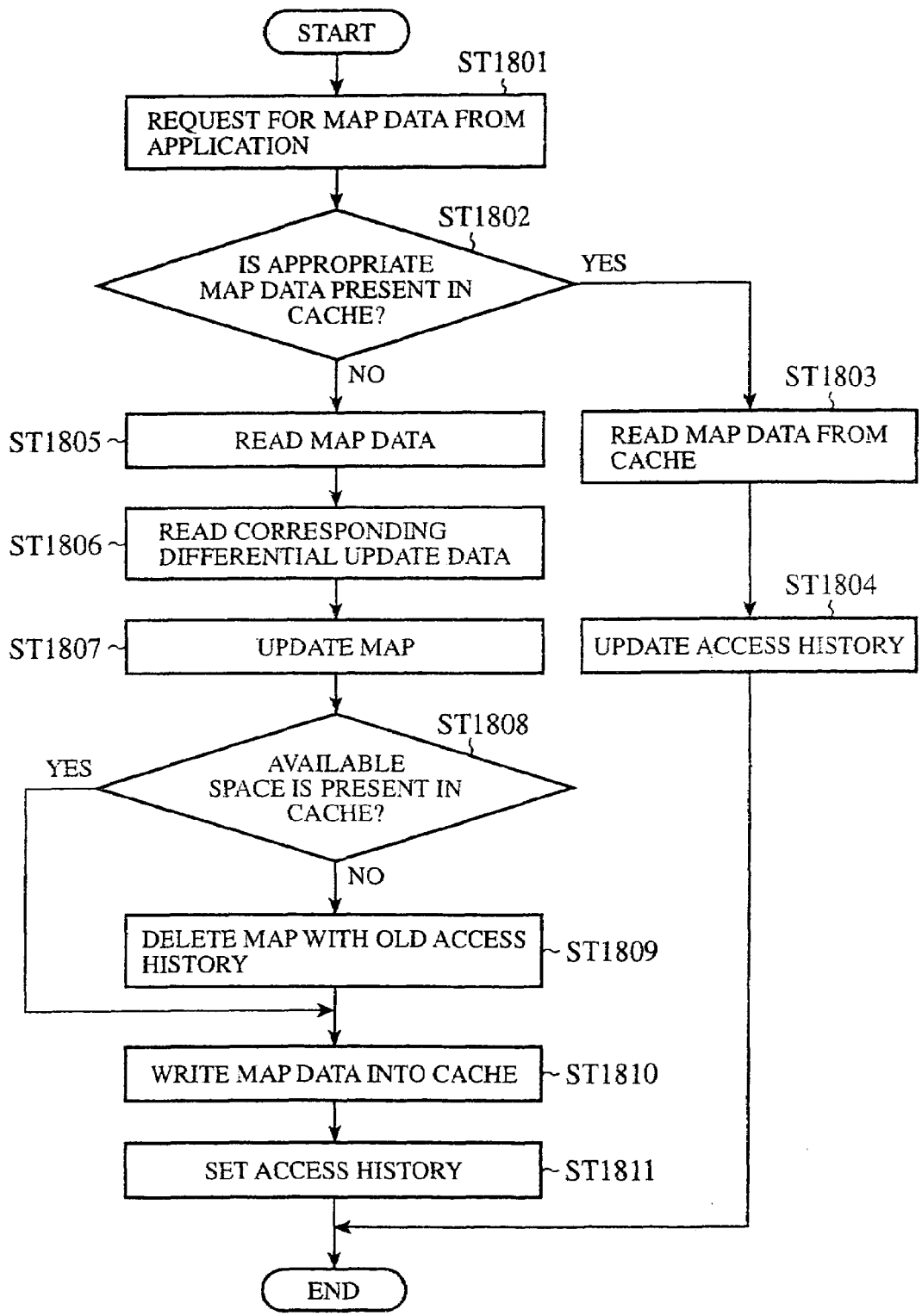
FIG. 17 is a flowchart illustrating the update operation of the map data by a post-update data cache section in the embodiment 6 of the map data processing unit in accordance with the present invention.

FIG. 17 is a flowchart illustrating the update operation of the map data using the post-update data cache section 301 in the embodiment 6 of the map data processing unit.

Referring to the flowchart of FIG. 17, the operation will be described.

When a request for map data is delivered from an application at step ST1801, the control section 108 makes a decision as to whether the requested map data is present in the cache or not at step ST1802. If the map data is present in the cache, the control section 108 reads the appropriate map data from the cache at step ST1803. Then, after updating the access history of the cache at step ST1804, the control section 108 terminates the processing. In contrast, if the map data is not present in the cache, the control section 108 reads the appropriate map data from the map data storing section 101 at step ST1805, and acquires the corresponding differential update data from the update data input section 102 at step ST1806. Then, the control section 108 has the dynamic update section 104 update the map at step ST1807. Subsequently, the control section 108 makes a decision as to whether the cache has available space or not at step ST1808. If it has no available space, the control section 108 deletes the oldest map data in the access history from the cache at step ST1809. In contrast, if the cache includes available space, or after deleting the oldest map data in the access history from the cache, the control section 108 writes the updated map data into the cache at step ST1810. Finally, after setting the access history at step ST1811, the control section 108 terminates the processing.

As described above, the present embodiment 6 includes the post-update data cache section 301. Accordingly, if the post-update data cache section 301 includes the map data requested from the application, the present embodiment 6 can utilize the map data of the latest version by only reading the map data by the post-update data cache section 301. Consequently, the present embodiment 6 offers an advantage of being able to provide the map data processing unit capable of reducing the time of the dynamic update processing.

Embodiment 7

Figure 18:
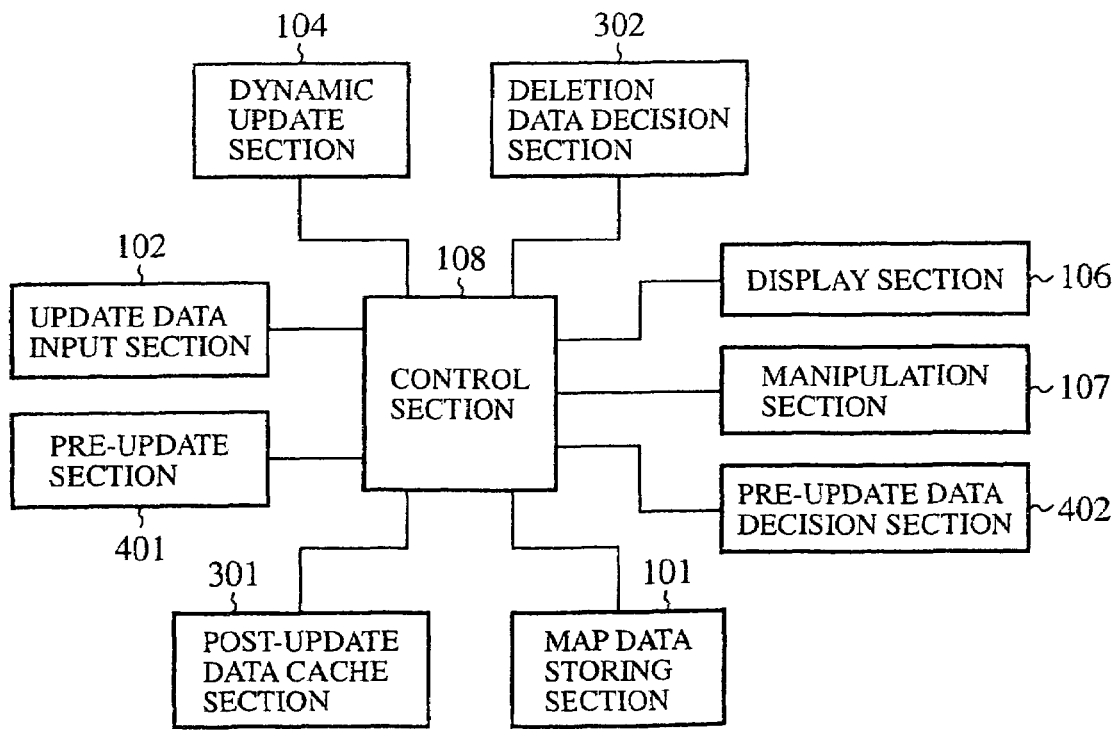
FIG. 18 is a block diagram showing a configuration of an embodiment 7 of the map data processing unit in accordance with the present invention.

FIG. 18 is a block diagram showing a configuration of the present embodiment 7 of the map data processing unit. In FIG. 18, the same or like portions to those of FIG. 16 are designated by the same reference numerals, and their description is omitted here. The present embodiment 7 of the map data processing unit comprises a pre-update section 401 for carrying out map update beforehand, and a pre-update data decision section 402 for deciding the map data to be updated by the pre-update section 401 beforehand.

According to the present embodiment 7, the pre-update data decision section 402 decides the map data to be updated by the pre-update section 401 beforehand, and the pre-update section 401 carries out the map update beforehand and stores the map data into the post-update data cache in advance. Accordingly, the present embodiment 7 offers an advantage of being able to provide a map data processing unit capable of reducing the time of the dynamic update processing of the map data used at a high frequency by storing the highly used map data in the post-update data cache.

Embodiment 8

Figure 19:
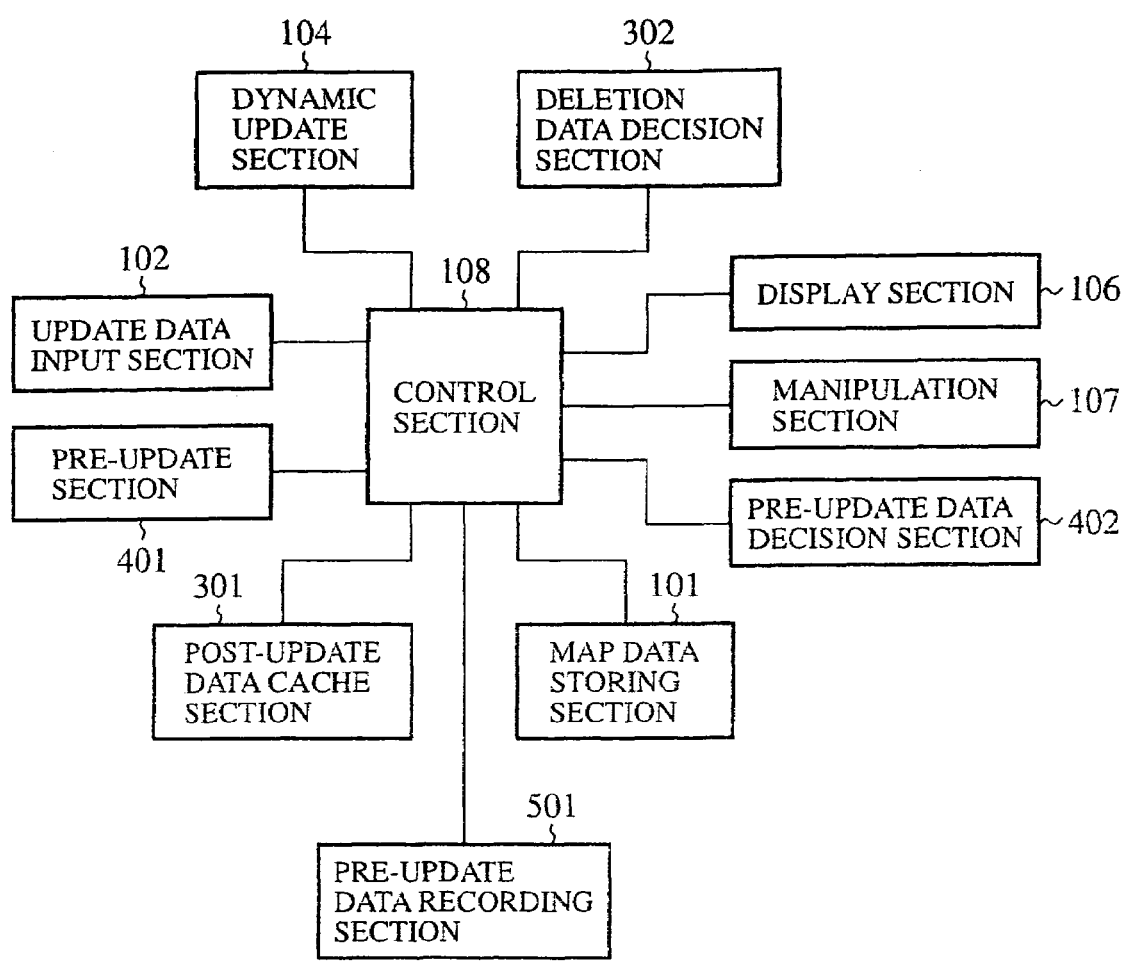
FIG. 19 is a block diagram showing a configuration of an embodiment 8 of the map data processing unit in accordance with the present invention.

FIG. 19 is a block diagram showing a configuration of the present embodiment 8 of the map data processing unit. In FIG. 19, the same or like portions to those of FIG. 18 are designated by the same reference numerals, and their description is omitted here. The present embodiment 8 of the map data processing unit comprises a pre-update data recording section 501 for recording the map data updated by the pre-update section 401 in advance. According to the present embodiment 8, the pre-update data recording section 501 stores the map data updated in advance. Consequently, if the stored map data is the map data used at high frequency, the present embodiment 8 offers an advantage of being able to provide a map data processing unit capable of reducing the time of the dynamic update processing of the highly used map data.

Embodiment 9

Figure 20:
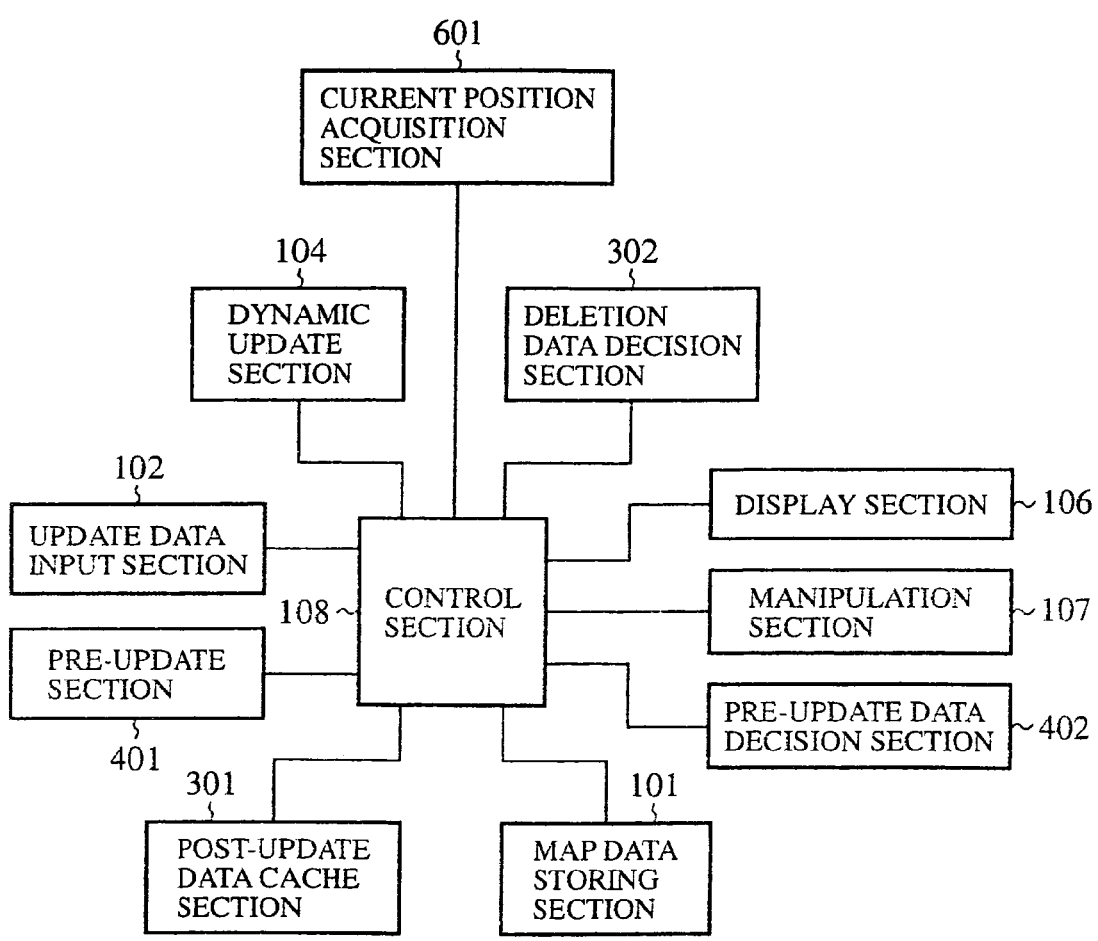
FIG. 20 is a block diagram showing a configuration of an embodiment 9 of the map data processing unit in accordance with the present invention.

FIG. 20 is a block diagram showing a configuration of the present embodiment 9 of the map data processing unit. In FIG. 20, the same or like portions to those of FIG. 18 are designated by the same reference numerals, and their description is omitted here. The present embodiment 9 of the map data processing unit comprises a current position acquisition section 601 for detecting the position of a vehicle it belongs to.

Figure 21:
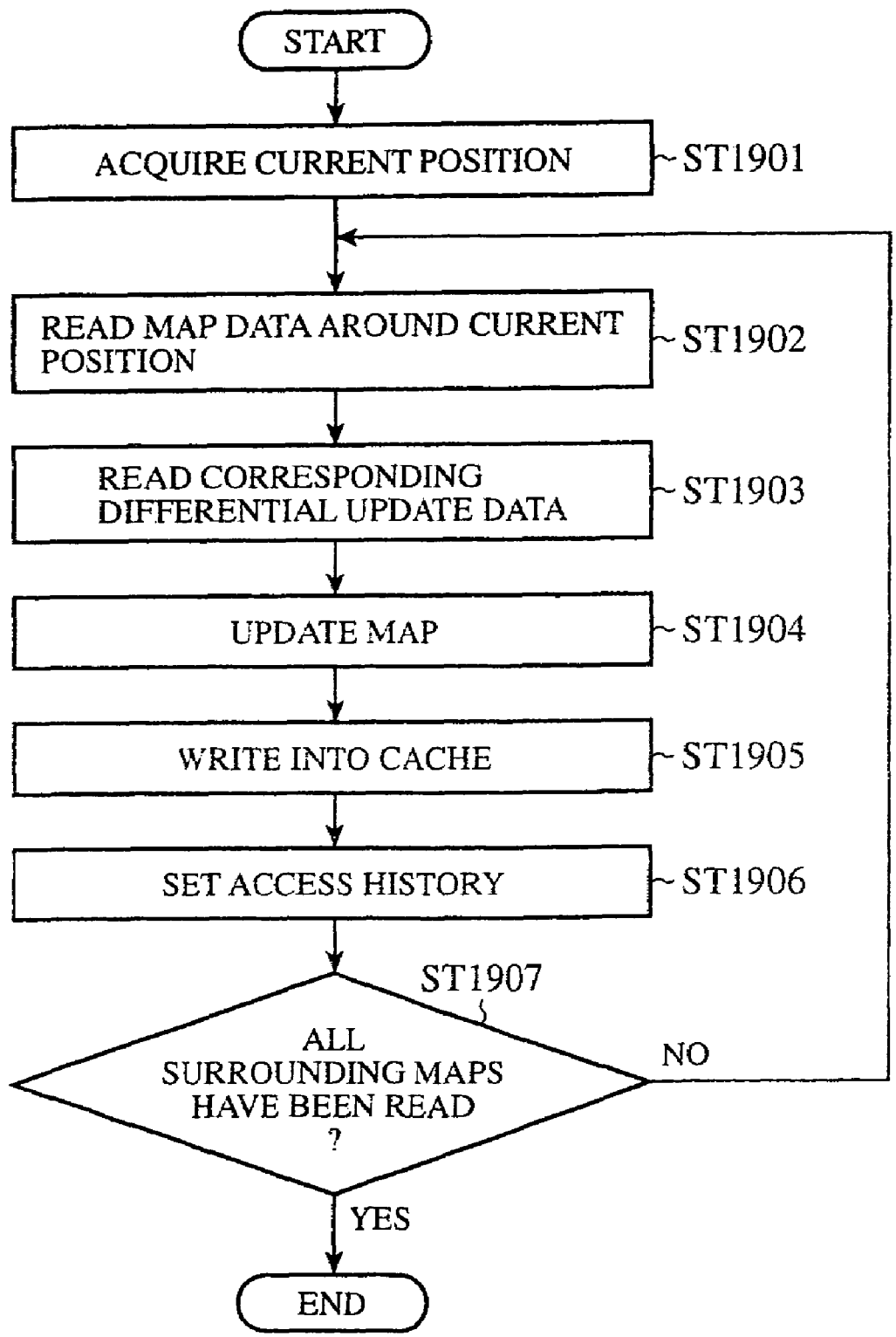
FIG. 21 is a flowchart illustrating the update operation of the map data by a current position acquisition section of the embodiment 9 of the map data processing unit in accordance with the present invention.

FIG. 21 is a flowchart illustrating the update operation of the map data by using the current position acquisition section 601 in the embodiment 9 of the map data processing unit.

Referring to the flowchart of FIG. 21, the operation will be described.

First, the pre-update section 401 acquires the current position from the current position acquisition section 601 at step ST1901. Second, the pre-update section 401 reads the map data around the current position from the map data storing section 101 at step ST1902, and acquires the differential update data corresponding to the map data from the update data input section 102 at step ST1903. Then, the pre-update section 401 updates the map at step ST1904. Subsequently, the pre-update section 401 has the post-update data cache section 301 write the updated map data into the cache at step ST1905, and sets the access history at step ST1906. Finally, the pre-update section 401 makes a decision as to whether all the surrounding maps have been read at step ST1907, and terminates the processing if all the maps have been read. If there is some map data left, the pre-update section 401 repeats the processing from step ST1902.

According to the present embodiment 9, the post-update data cache stores the update data around the position of the vehicle (current position). Thus, the present embodiment 9 offers an advantage of being able to provide a map data processing unit capable of reducing the time of the dynamic update processing of the map data around the position of the vehicle, which is used at high frequency.

Embodiment 10

Figure 22:
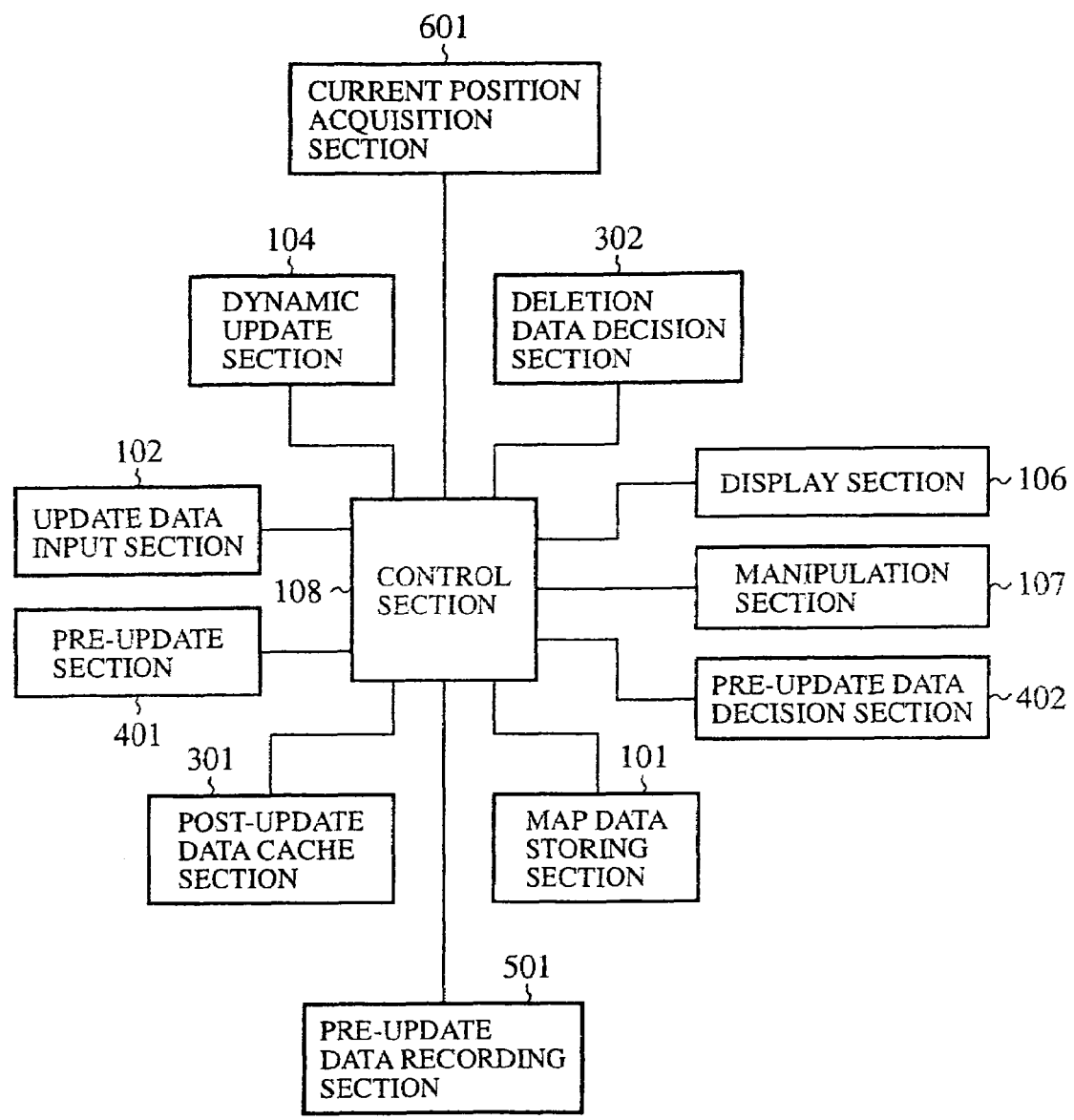
FIG. 22 is a block diagram showing a configuration of an embodiment 10 of the map data processing unit in accordance with the present invention.

FIG. 22 is a block diagram showing a configuration of the present embodiment 10 of the map data processing unit. In FIG. 22, the same or like portions to those of FIG. 20 are designated by the same reference numerals, and their description is omitted here.

The present embodiment 10 of the map data processing unit comprises a pre-update data recording section 501. The pre-update data recording section 501 stores the map data updated by the pre-update section 401 in advance.

Figure 23:
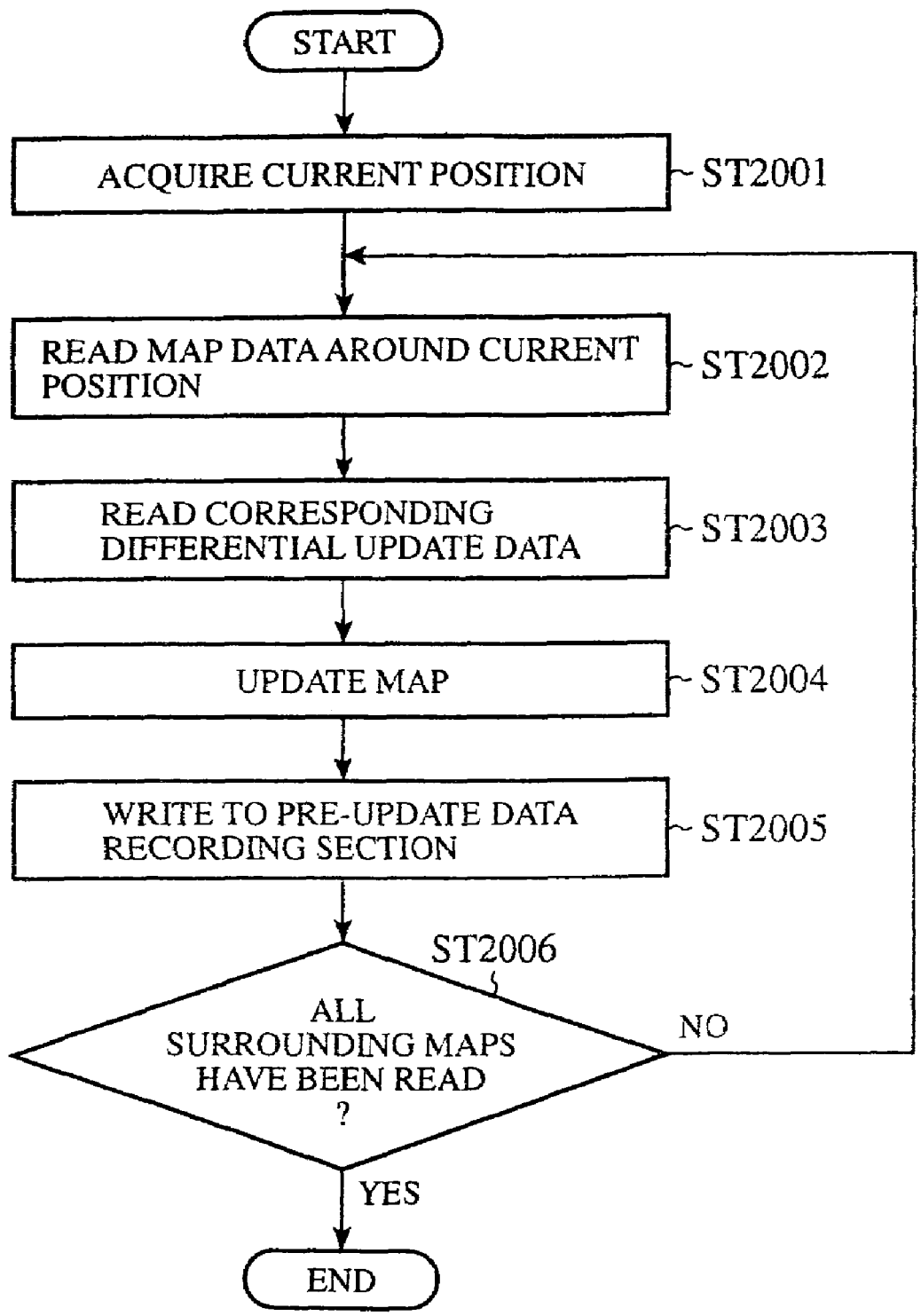
FIG. 23 is a flowchart illustrating the update operation of the map data by the current position acquisition section and pre-update section in the embodiment 10 of the map data processing unit in accordance with the present invention.

FIG. 23 is a flowchart illustrating the update operation of the map data by using the current position acquisition section 601 and pre-update section 401 in the embodiment 10 of the map data processing unit.

Referring to the flowchart of FIG. 23, the operation will be described.

First, the pre-update section 401 acquires the current position from the current position acquisition section 601 at step ST2001. Subsequently, the pre-update section 401 reads the map data around the current position from the map data storing section 101 at step ST2002, and acquires the corresponding differential update data from the update data input section 102 at step ST2003, followed by updating the map at step ST2004. Then, the pre-update section 401 writes the map data updated in advance into the pre-update data recording section 501 at step ST2005, and makes a decision as to whether all the surrounding maps have been read at step ST2006. If all the surrounding maps have been read, the pre-update section 401 terminates the processing. In contrast, when the map data that has not yet been read is left, the pre-update section 401 repeats the processing from step ST2002.

According to the present embodiment 10, the pre-update data recording section 501 stores the map data updated in advance by the pre-update section 401. Thus, the present embodiment 10 offers an advantage of being able to provide a map data processing unit capable of reducing the time of the dynamic update processing of the map data around the position of the vehicle, which is used at high frequency.

Embodiment 11

Figure 24:
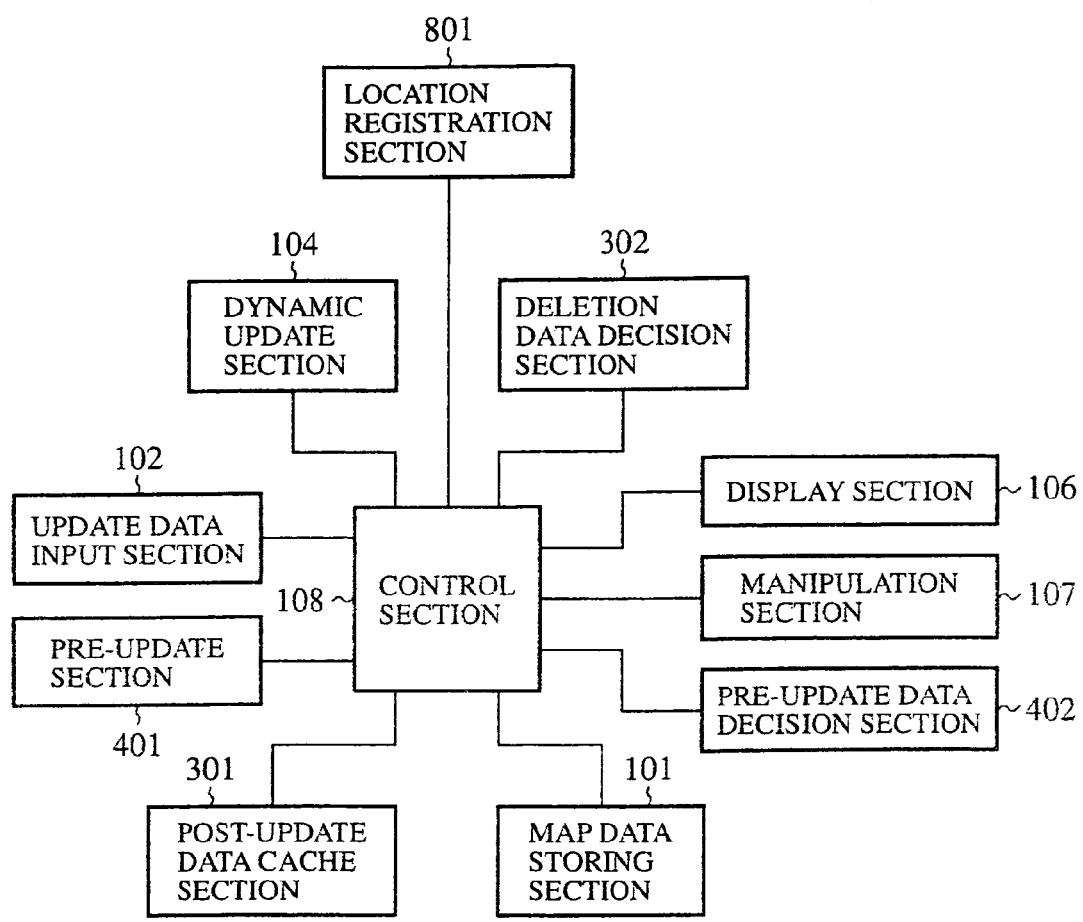
FIG. 24 is a block diagram showing a configuration of an embodiment 11 of the map data processing unit in accordance with the present invention.

FIG. 24 is a block diagram showing a configuration of the present embodiment 11 of the map data processing unit. In FIG. 24, the same or like portions to those of FIG. 18 are designated by the same reference numerals, and their description is omitted here.

The present embodiment 11 of the map data processing unit comprises a location registration section 801 for carrying out location registration.

Next, the operation of the present embodiment 11 will be described.

Figure 25:
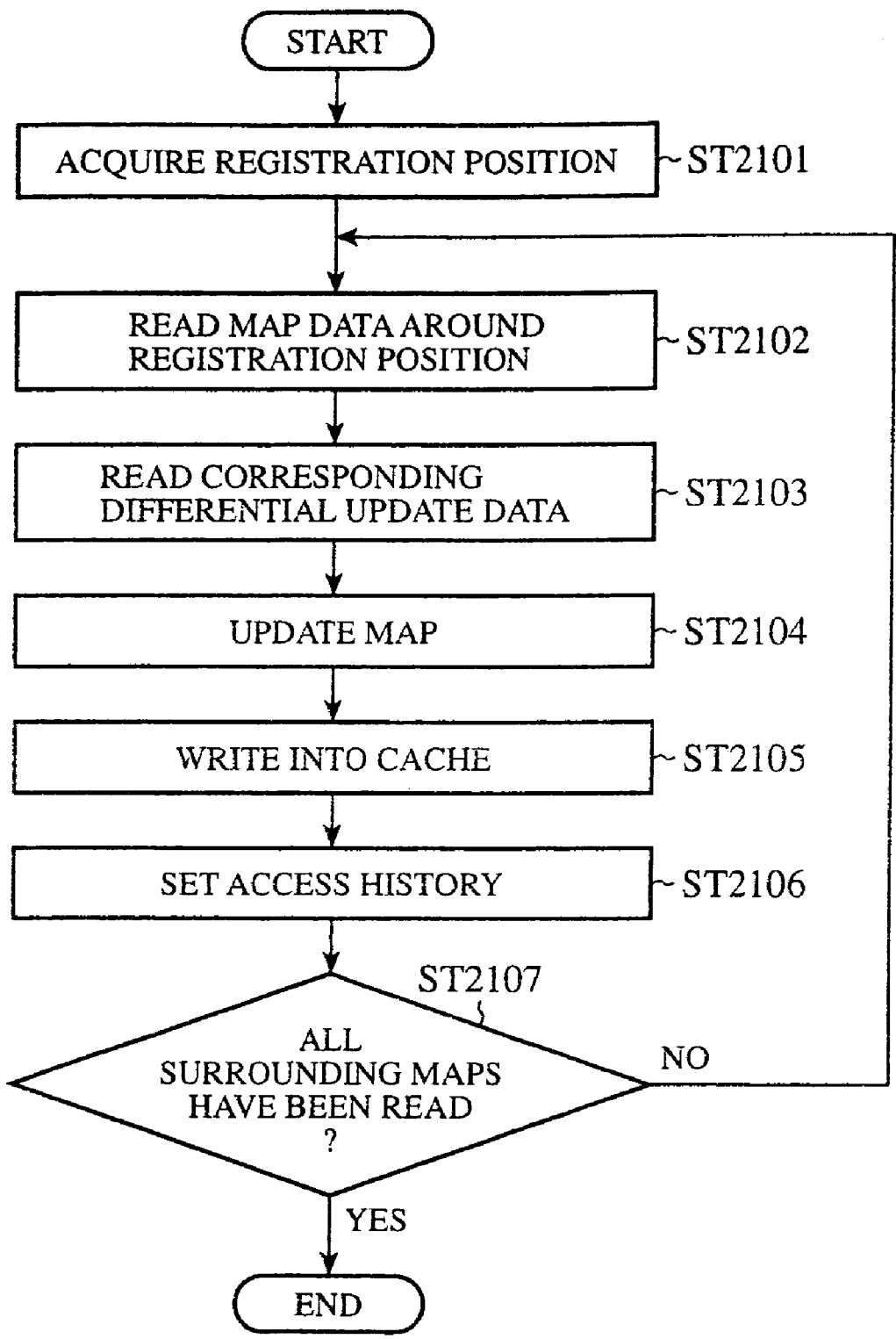
FIG. 25 is a flowchart illustrating the update operation of the map data using a location registration section and post-update data cache section of the embodiment 11 of the map data processing unit in accordance with the present invention.

FIG. 25 is a flowchart illustrating the update operation of the map data using the location registration section 801 and post-update data cache section 301 of the embodiment 11 of the map data processing unit. Referring to the flowchart of FIG. 25, the operation will be described.

First, the pre-update section 401 acquires a registration position from the location registration section 801 at step ST2101.

Subsequently, the pre-update section 401 reads the map data around the registration position from the map data storing section 101 at step ST2102, and acquires the corresponding differential update data from the update data input section 102 at step ST2103, followed by updating the map at step ST2104.

Then, the pre-update section 401 has the post-update data cache section 301 write the updated map data into the cache at step ST2105, and sets the access history at step ST2106. Subsequently, the pre-update section 401 makes a decision as to whether all the surrounding maps have been read or not at step ST2107. If all the surrounding maps have been read, the pre-update section 401 terminates the processing. If there is some map data left, the pre-update section 401 repeats the processing from step ST2102.

According to the present embodiment 11, the post-update data cache stores the update data around the registration position. Thus, the present embodiment 11 offers an advantage of being able to provide a map data processing unit capable of reducing the time of the dynamic update processing of the map data around the registration location, which is used at high frequency.

Embodiment 12

Figure 26:
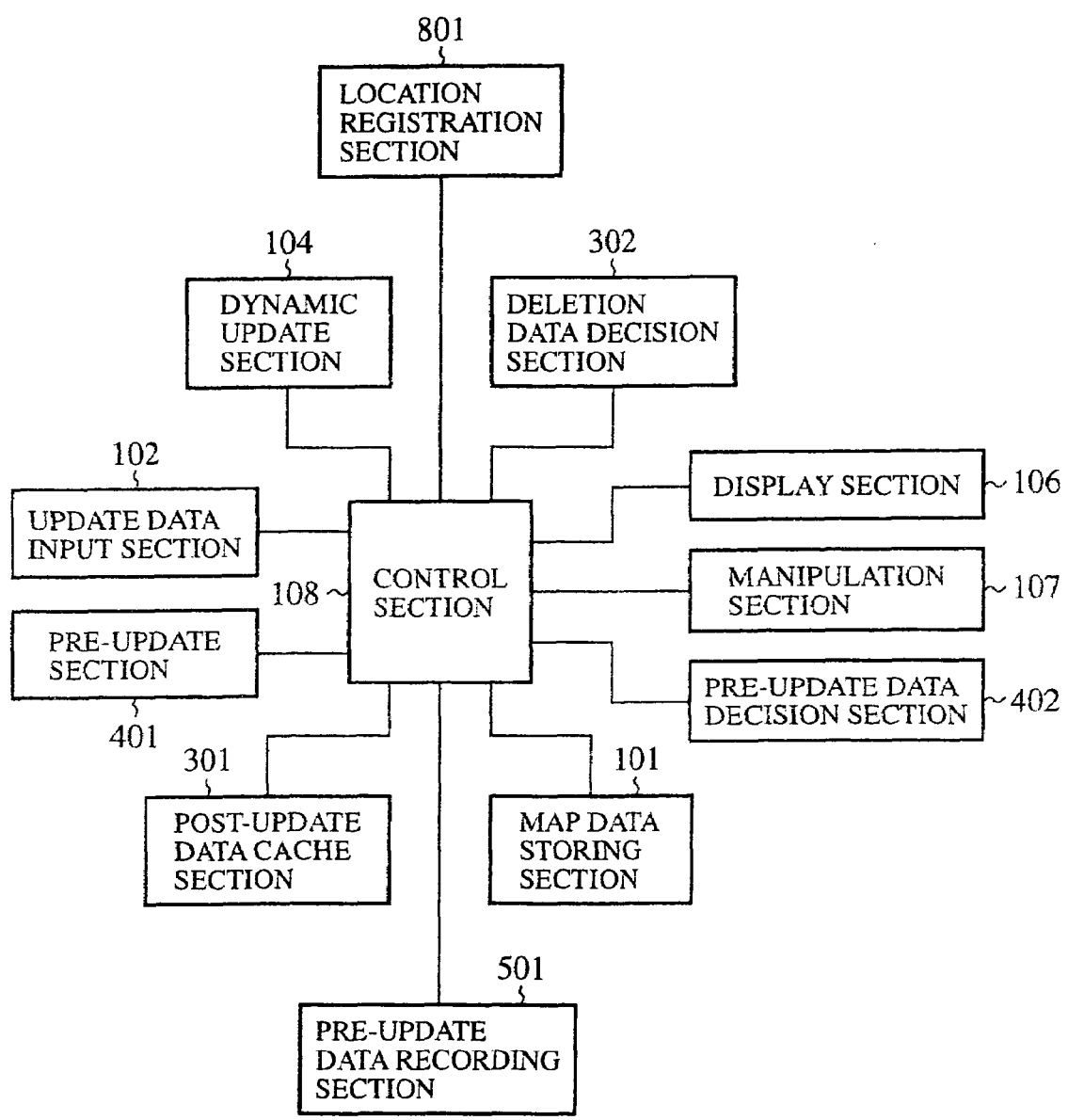
FIG. 26 is a block diagram showing a configuration of an embodiment 12 of the map data processing unit in accordance with the present invention.

FIG. 26 is a block diagram showing a configuration of the present embodiment 12 of the map data processing unit. In FIG. 26, the same or like portions to those of FIG. 24 are designated by the same reference numerals, and their description is omitted here.

The present embodiment 12 of the map data processing unit comprises a pre-update data recording section 501 which is not installed in the foregoing embodiment 11. The pre-update data recording section 501 stores the map data updated by the pre-update section 401 in advance as described above in the foregoing embodiment 10.

Figure 27:
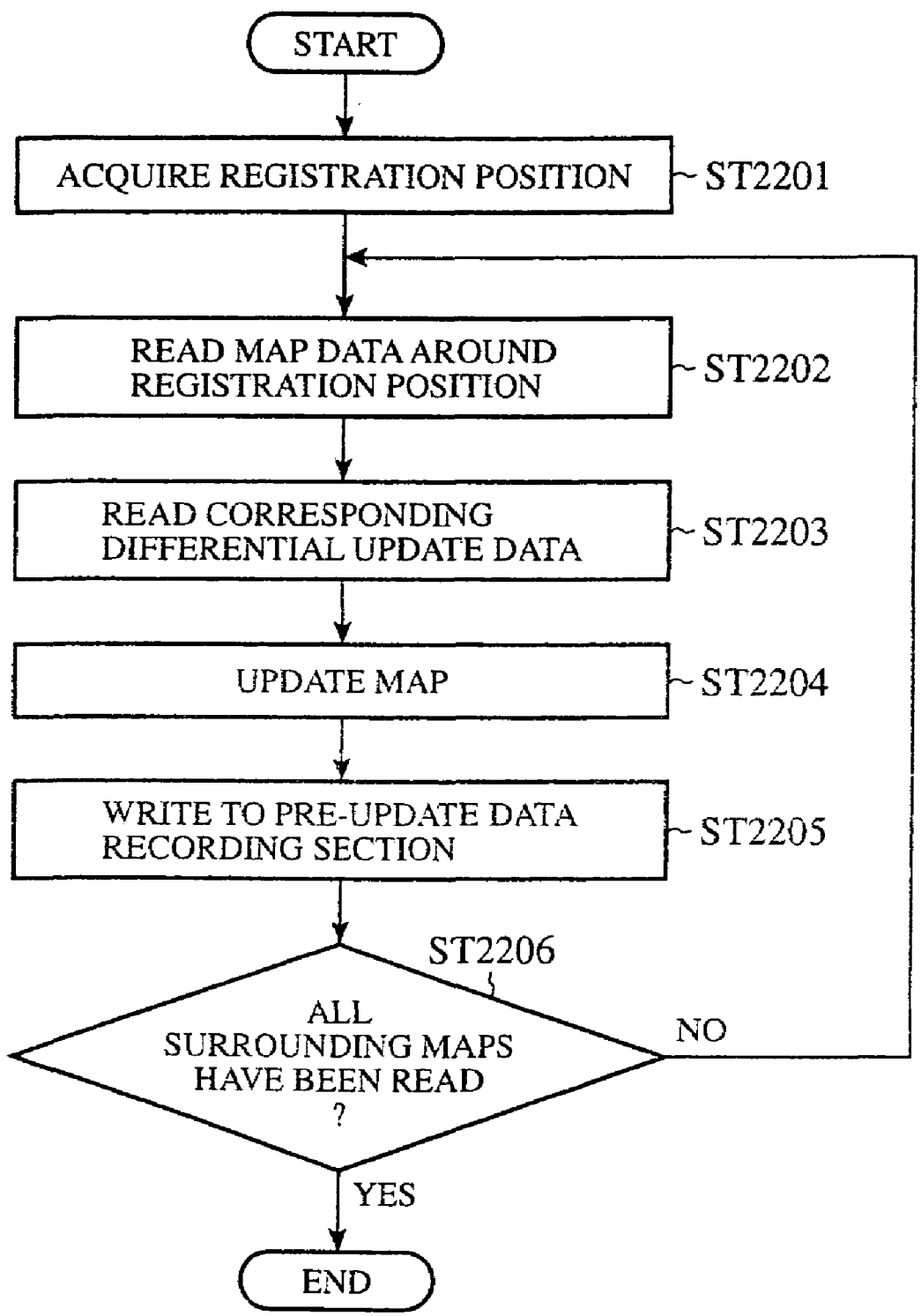
FIG. 27 is a flowchart illustrating the update operation of the map data using the location registration section and pre-update data recording section of the embodiment 12 of the map data processing unit in accordance with the present invention.

FIG. 27 is a flowchart illustrating the update operation of the map data by using the location registration section 801 and pre-update data recording section 501 in the embodiment 12 of the map data processing unit. Referring to the flowchart of FIG. 27, the operation will be described.

First, the pre-update section 401 acquires the registration position from the location registration section 801 at step ST2201. Subsequently, the pre-update section 401 reads the map data around registration position from the map data storing section 101 at step ST2202, and acquires the corresponding differential update data from the update data input section 102 at step ST2203, followed by updating the map at step ST2204. Then, the pre-update section 401 writes the updated map data into the pre-update data recording section 501 at step ST2205, and makes a decision as to whether all the surrounding maps have been read at step ST2206. If all the surrounding maps have been read, the pre-update section 401 terminates the processing. In contrast, when the map data that has not yet been read is left, the pre-update section 401 repeats the processing from step ST2202.

According to the present embodiment 12, the pre-update data recording section 501 stores the map data around the registration position. Thus, the present embodiment 12 offers an advantage of being able to provide a map data processing unit capable of reducing the time of the dynamic update processing of the map data around the registration location which is used at high frequency.

Embodiment 13

Figure 28:
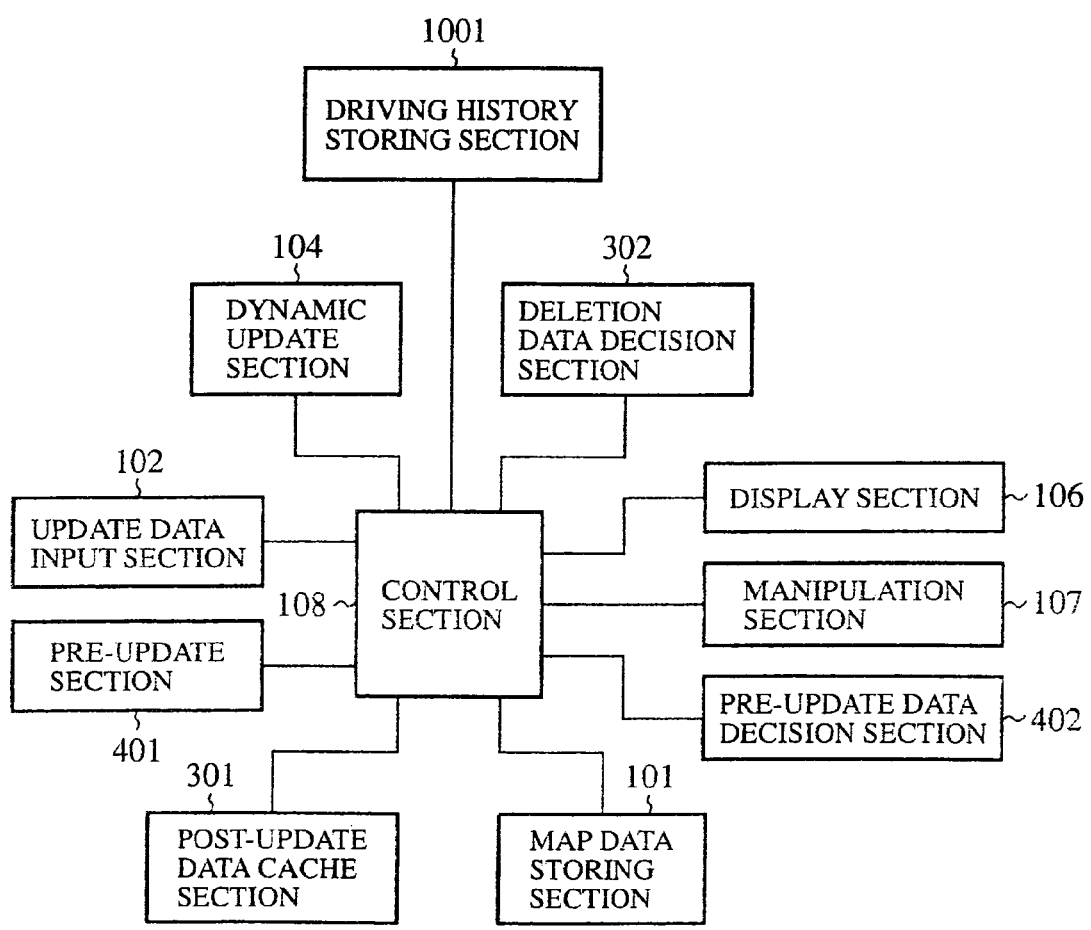
FIG. 28 is a block diagram showing a configuration of an embodiment 13 of the map data processing unit in accordance with the present invention.

FIG. 28 is a block diagram showing a configuration of the present embodiment 13 of the map data processing unit. In FIG. 28, the same or like portions to those of FIG. 18 are designated by the same reference numerals, and their description is omitted here. The present embodiment 28 of the map data processing unit comprises a driving history storing section 1001 for storing driving history.

Next, the operation of the present embodiment 13 will be described.

Figure 29:
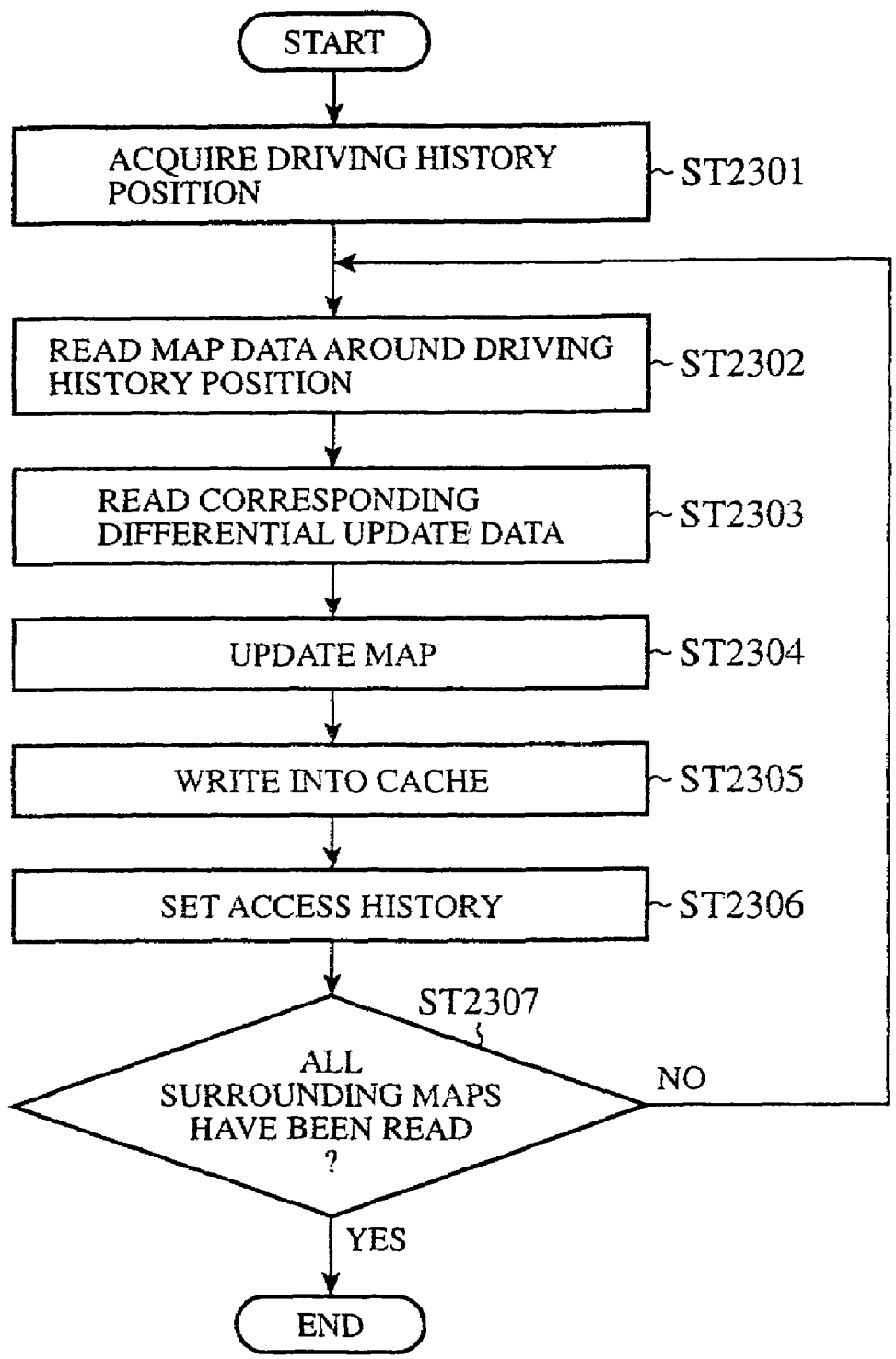
FIG. 29 is a flowchart illustrating the update operation of the map data using a driving history storing section and post-update data cache section of the embodiment 13 of the map data processing unit in accordance with the present invention.

FIG. 29 is a flowchart illustrating the update operation of the map data by using the driving history storing section 1001 and post-update data cache section 301 in the embodiment 13 of the map data processing unit. Referring to the flowchart of FIG. 29, the operation will be described.

First, the pre-update section 401 acquires the driving history position from the driving history storing section 1001 at step ST2301. Then, the pre-update section 401 reads the map data around the driving history position from the map data storing section 101 at step ST2302, and acquires the corresponding differential update data from the update data input section 102 at step ST2303, followed by updating the map at step ST2304. Subsequently, the pre-update section 401 has the post-update data cache section 301 write the updated map data into the cache at step ST2305, and sets the access history at step ST2306. Finally, the pre-update section 401 makes a decision as to whether all the surrounding maps have been read or not at step ST2307. If all the maps have been read, the pre-update section 401 terminates the processing. If there is some map data left, the pre-update section 401 repeats the processing from step ST2302.

According to the present embodiment 13, the post-update data cache stores the updated map data around the driving history position. Thus, the present embodiment 13 offers an advantage of being able to provide a map data processing unit capable of reducing the time of the dynamic update processing of the map data around the driving history position which is used at high frequency.

Embodiment 14

Figure 30:
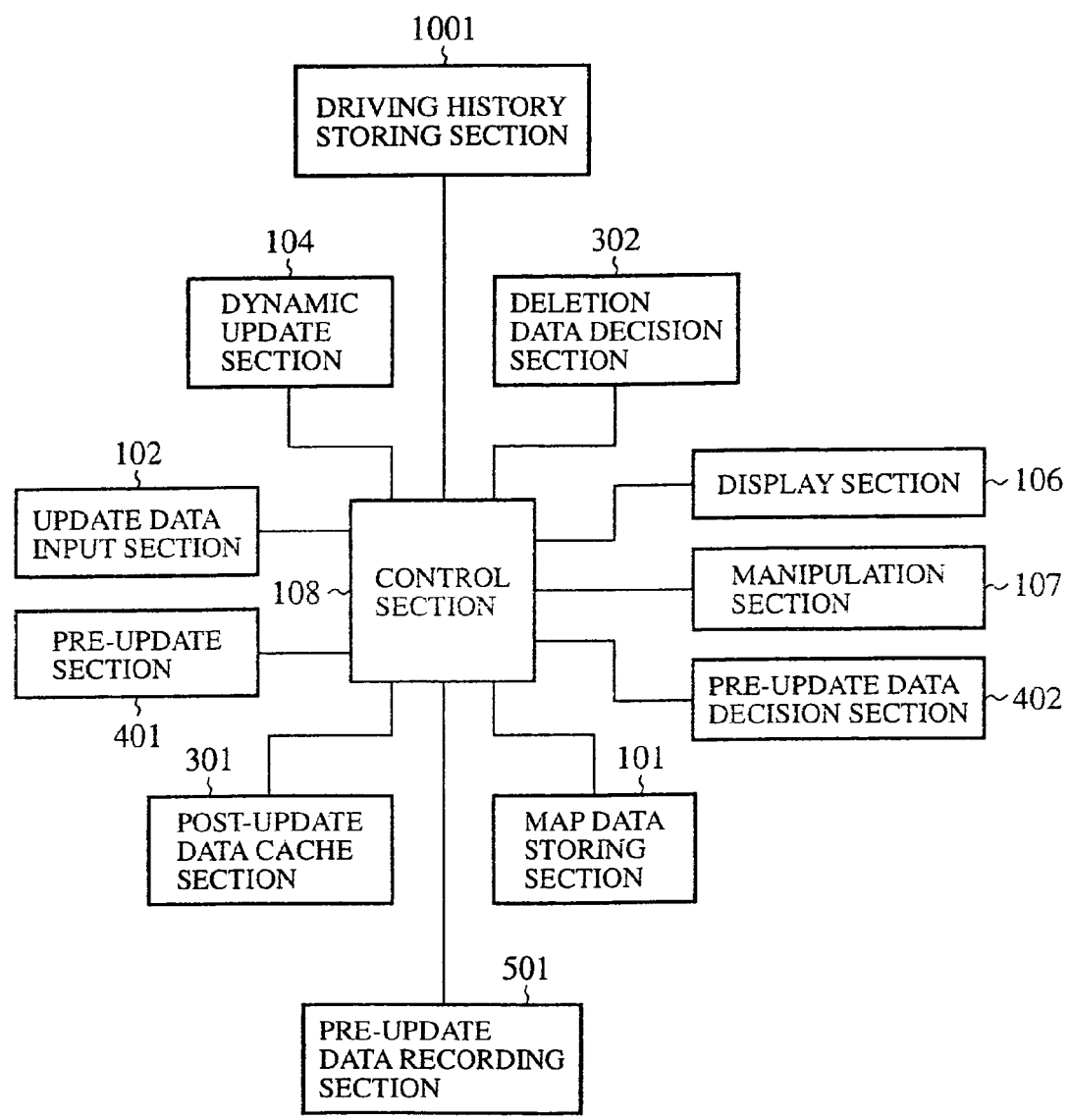
FIG. 30 is a block diagram showing a configuration of an embodiment 14 of the map data processing unit in accordance with the present invention.

FIG. 30 is a block diagram showing a configuration of the present embodiment 14 of the map data processing unit. The present embodiment 14 of map data processing unit comprises the pre-update data recording section 501 the foregoing embodiment 13 of the map data processing unit lacks. As described above in connection with the foregoing embodiment 12, the pre-update data recording section 501 records the map data updated by the pre-update section 401 in advance. In FIG. 30, since the remaining configuration is the same as that of the foregoing embodiment 13 of map data processing unit, their description is omitted here by designating the same or like portions to those of FIG. 28 by the same reference numerals.

Next, the operation of the present embodiment 14 will be described.

Figure 31:
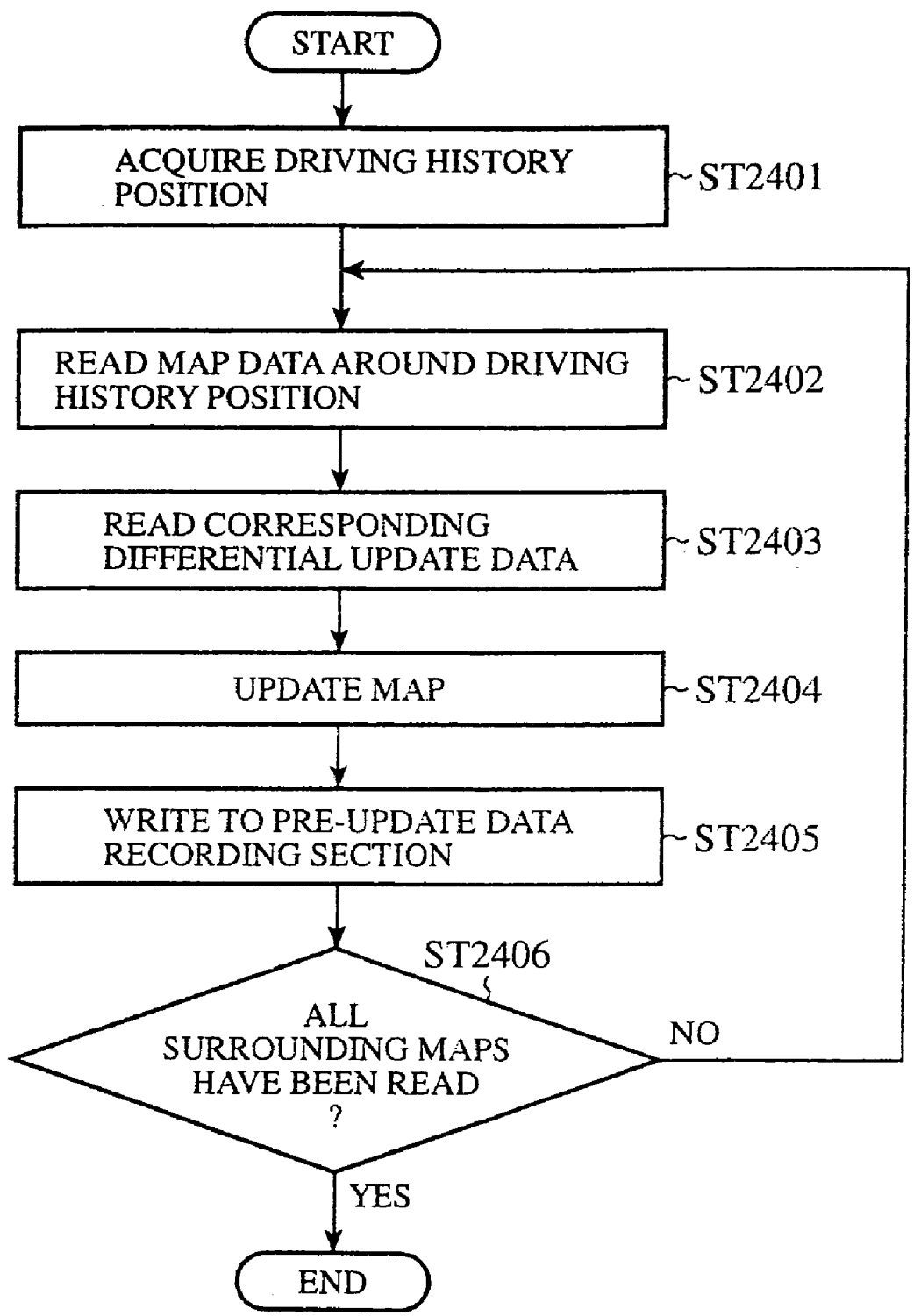
FIG. 31 is a flowchart illustrating the update operation of the map data using the driving history storing section and pre-update section of the embodiment 14 of the map data processing unit in accordance with the present invention.

FIG. 31 is a flowchart illustrating the update operation of the map data by using the driving history storing section 1001 and pre-update section 401 in the present embodiment 14 of the map data processing unit. Referring to the flowchart of FIG. 31, the operation will be described.

First, the pre-update section 401 acquires the driving history position from the driving history storing section 1001 at step ST2401. Second, the pre-update section 401 reads the map data around the driving history position from the map data storing section 101 at step ST2402, acquires the corresponding differential update data from the update data input section 102 at step ST2403, and updates the map at step ST2404. Then, the pre-update section 401 writes the updated map data into the pre-update data recording section 501 at step ST2405. Finally, the pre-update section 401 makes a decision as to whether all the surrounding maps have been read at step ST2406. If all the maps have been read, the pre-update section 401 terminates the processing. If there is some map data left, the pre-update section 401 repeats the processing from step ST2402.

Incidentally, as the driving history, it is possible to use not only coordinates of places passed by in actual drives, but also coordinates of destinations or places on a route which are set in route search, or coordinates of places of a search route.

As described above, according to the present embodiment 14, the pre-update data recording section 501 stores the map data updated by using the map data around the driving history position and the corresponding differential update data. Thus, the present embodiment 14 offers an advantage of being able to provide a map data processing unit capable of reducing the time of the dynamic update processing of the map data around the driving history position, which is used at high frequency.

Embodiment 15

Figure 32:
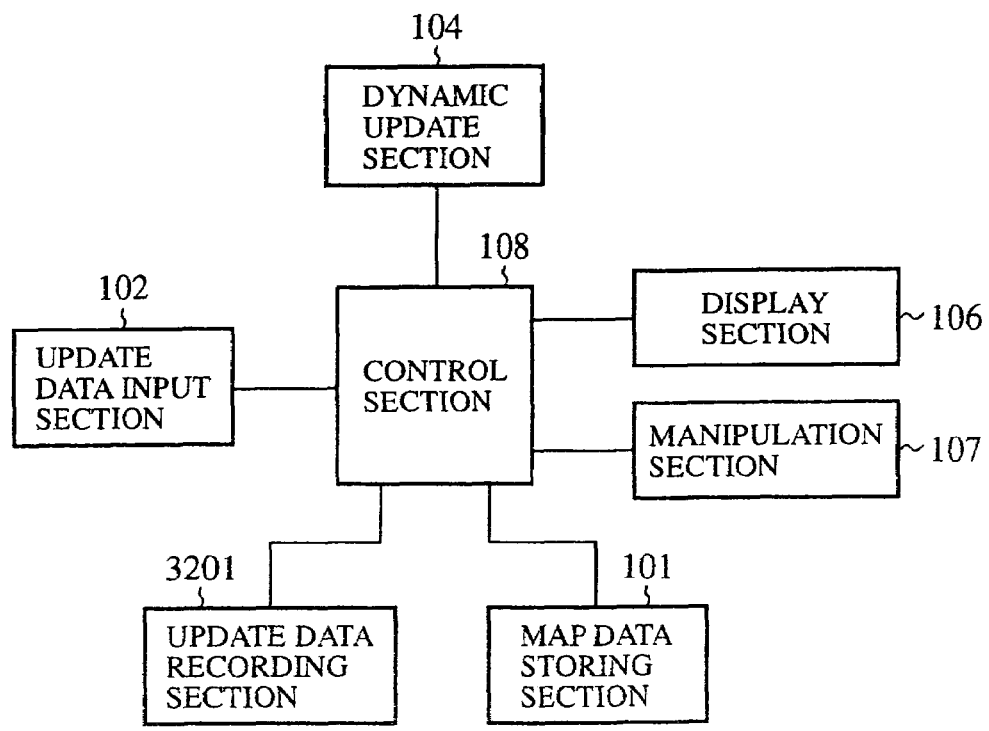
FIG. 32 is a block diagram showing a configuration of an embodiment 15 of the map data processing unit in accordance with the present invention.

FIG. 32 is a block diagram showing a configuration of the present embodiment 15 of the map data processing unit. In FIG. 32, the same or like portions to those of FIG. 1 are designated by the same reference numerals, and their description is omitted here. The present embodiment 15 of the map data processing unit comprises an update data recording section 3201 for recording the update data fed from the update data input section 102.

Next, the operation of the present embodiment 15 will be described.

Figure 33:
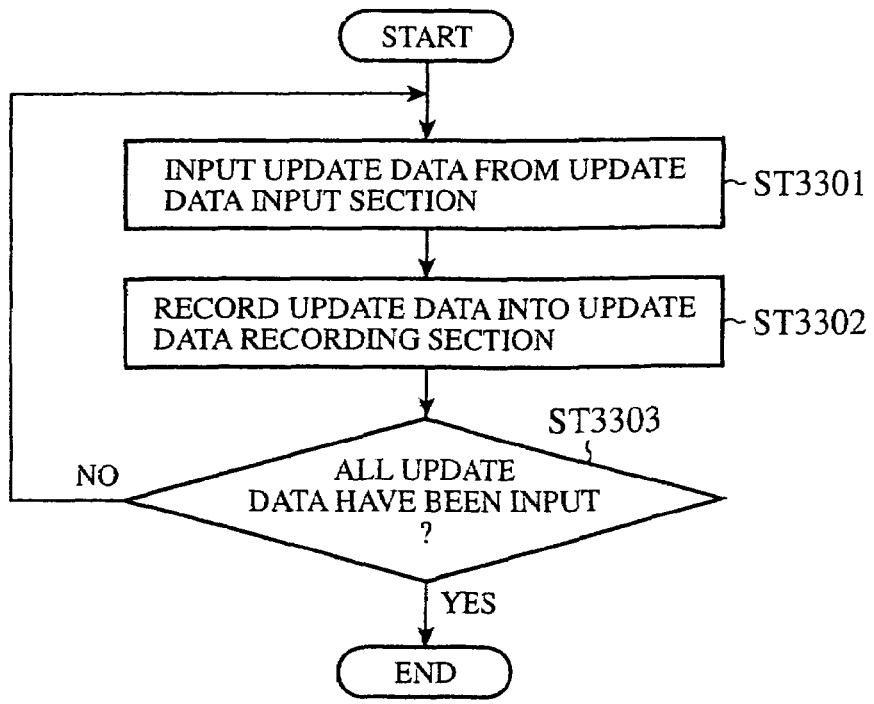
FIG. 33 is a flowchart illustrating the update data recording operation into the update data recording section of the embodiment 15 of the map data processing unit in accordance with the present invention.
Figure 34:
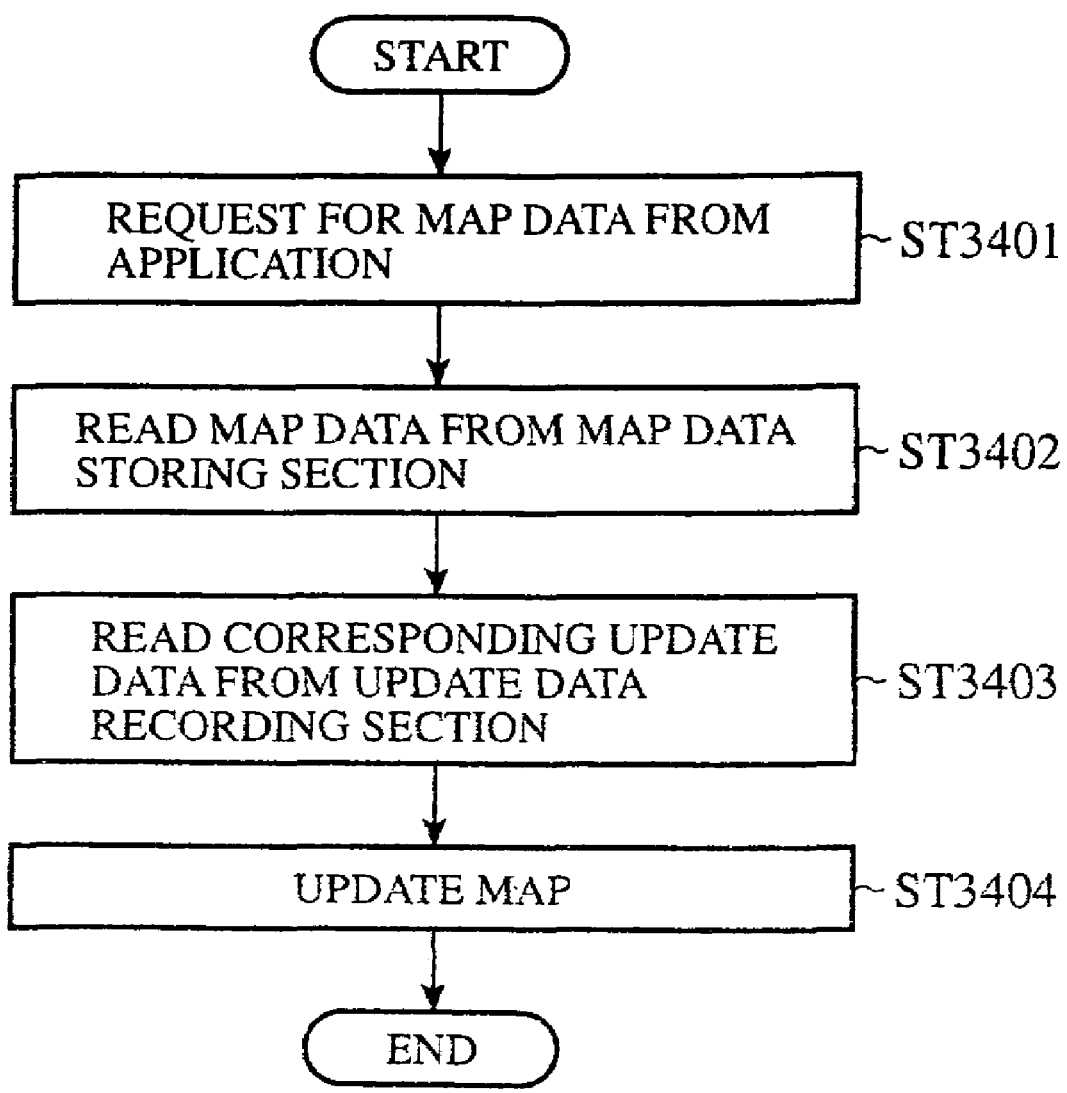
FIG. 34 is a flowchart illustrating the update operation of the map data by the dynamic update section of the embodiment 15 of the map data processing unit in accordance with the present invention.

FIG. 33 is a flowchart illustrating the update data recording operation into the update data recording section 3201 of the embodiment 15, and FIG. 34 is a flowchart illustrating the update operation of the map data by the dynamic update section 104 of the embodiment 15.

Referring to the flowcharts of FIGS. 33 and 34, the operation will be described.

First, the recording operation of the update data into the update data recording section 3201 will be described with reference to the flowchart of FIG. 33. The control section 108 acquires the update data from the update data input section 102 at a timing different from the timing of a navigation operation at step ST3301, and records the update data in the update data recording section 3201 at step ST3302. Subsequently, the control section 108 makes a decision as to whether all the update data have been input or not at step ST3303. If the input has been completed, the control section 108 terminates the processing, and otherwise it repeats the processing from step ST3301.

Next, the operation of the dynamic update section 104 will be described with reference to the flowchart of FIG. 34. In response to a request for map data from an application at step ST3401, the dynamic update section 104 reads the appropriate map data from the map data storing section 101 at step ST3402. Then, the dynamic update section 104 reads the update data corresponding to the read map data from the update data recording section 3201 at step ST3403, followed by updating the map at step ST3404.

Thus, the present embodiment 15 updates the map in accordance with the update data recorded in the update data recording section 3201. Therefore it is not necessary to input the update data from the update data input section 102 during the navigation operation. This makes it possible to use the update data input section 102 for other purposes during the navigation operation. For example, when the update data input section 102 is a DVD, it can carry out DVD video replay during the navigation operation. When the update data input section 102 is a memory card, it is applicable to other navigation data exchange.

Furthermore, the speed-up of the map update itself can be expected by using a high-speed medium such as a hard disk as the update data recording section 3201.

Although the foregoing description is made assuming that the update data recording section 3201 is installed separately from the map data storing section 101, they may be incorporated into the same medium. For example, the same hard disk can record the map data and the update data.

As described above, the present embodiment 15 offers an advantage of being able to provide a map data processing unit capable of using the update data input section 102 for other purposes during the navigation operation by recording the update data into the update data recording section 3201 at a timing different from the navigation operation period.

The invention claimed is:

1. A map data processing unit that has a function of updating map data, and includes a display section for performing various types of display including display of a processing result of the map data, a manipulation section for carrying out input manipulation for processing the map data, and a control section for performing entire control, said map data processing unit comprising:

a post-update data cache section for temporarily storing, in a cache, latest version map data to be read in response to a request for map data;

an update data input section for inputting update data for updating the map data to the latest version map data, when said post-update data cache section does not store the map data; and a dynamic update section for updating, when said update data input section inputs the update data, old version map data to latest version map data to be stored in the cache, in accordance with the update data fed from said update data input section every time a request for the map data occurs;

a pre-update section for updating a plurality of map data in advance;

a pre-update decision section for deciding the map data to be updated in advance by said pre-update section; and a pre-update data recording section for recording the map data that is updated by said pre-update section and is to be read in response to the request for the map data.

2. The map data processing unit according to claim 1 wherein said post-update data cache section stores the map data that is updated by said pre-update section and is to be read in response to the request of the map data.

3. The map data processing unit according to claim 2, further comprising a current position acquisition section for acquiring a current position, wherein said pre-update section updates in advance the map data around the current position acquired by said current position acquisition section.

4. The map data processing unit according to claim 2, further comprising a location registration section for carrying out location registration, wherein said pre-update section updates in advance the map data around the location registered in said location registration section.

5. The map data processing unit according to claim 2, further comprising a driving history recording section for storing driving history information, wherein said pre-update section updates in advance the map data around a place indicated by the driving history information stored in said driving history recording section.

6. The map data processing unit according to claim 1, further comprising a current position acquisition section for acquiring a current position, wherein said pre-update section updates in advance the map data around the current position acquired by said current position acquisition section.

7. The map data processing unit according to claim 1, further comprising a location registration section for carrying out location registration, wherein said pre-update section updates in advance the map data around the location registered in said location registration section.

8. The map data processing unit according to claim 1, further comprising a driving history recording section for storing driving history information, wherein said pre-update section updates in advance the map data around a place indicated by the driving history information stored in said driving history recording section.

* * * * *